(12) United States Patent
Nguyen et al.

(10) Patent No.: US 12,288,122 B2
(45) Date of Patent: Apr. 29, 2025

(54) SENSING FIBER FOR MONITORING ROPE CONDITION, AND METHOD OF MANUFACTURING THE SAME

(71) Applicant: Advanced Functional Fabrics of America, Inc., Cambridge, MA (US)

(72) Inventors: Jimmy Nguyen, Lowell, MA (US); Edin Insanic, Belmont, MA (US); Kristina McCarthy, Oxford, MA (US)

(73) Assignee: Advanced Functional Fabrics of America, Inc., Cambridge, MA (US)

( * ) Notice: Subject to any disclaimer, the term of this patent is extended or adjusted under 35 U.S.C. 154(b) by 76 days.

(21) Appl. No.: 18/193,288

(22) Filed: Mar. 30, 2023

(65) Prior Publication Data

US 2023/0316015 A1 Oct. 5, 2023

Related U.S. Application Data

(60) Provisional application No. 63/325,264, filed on Mar. 30, 2022.

(51) Int. Cl.
*G06K 7/10* (2006.01)
(52) U.S. Cl.
CPC ................................ *G06K 7/10366* (2013.01)
(58) Field of Classification Search
CPC .................................................. G06K 7/10366
See application file for complete search history.

(56) References Cited

U.S. PATENT DOCUMENTS

| 7,441,464 | B2 | 10/2008 | Turnbull et al. |
| 11,008,703 | B2 | 5/2021 | Ernst et al. |
| 11,319,667 | B2 | 5/2022 | Bosman |
| 2008/0084274 | A1* | 4/2008 | Ohashi ............ G06K 19/07718 340/10.1 |
| 2008/0105059 | A1 | 5/2008 | Turnbull et al. |
| 2012/0182130 | A1* | 7/2012 | Sarchi .................... B66C 13/12 340/10.1 |
| 2013/0077281 | A1* | 3/2013 | Brun ................ G06K 19/07718 361/807 |
| 2014/0229011 | A1 | 8/2014 | Fukui et al. |

(Continued)

FOREIGN PATENT DOCUMENTS

| CN | 104570246 A | 4/2015 |
| DE | 102012108036 B3 | 12/2013 |

(Continued)

OTHER PUBLICATIONS

International Search Report and Written Opinion for International Patent Application No. PCT/US2023/016893 dated Jan. 26, 2024 (16 pages).

*Primary Examiner* — Jamara A Franklin
(74) *Attorney, Agent, or Firm* — Goodwin Procter LLP

(57) ABSTRACT

A system for monitoring performance of a rope includes a drawn form factor that has a plurality of radio-frequency identification (RFID) devices (e.g., embedded therein). The form factor is integrated into a core portion of the rope. Each RFID device is configured to transmit a corresponding message to at least one receiver in response to an interrogation initiated by at least one transmitter. The messages enable the determination of at least one characteristic of the rope based on a spatial relationship of the plurality of RFID devices and a timing of the received messages.

50 Claims, 16 Drawing Sheets

(56) References Cited

U.S. PATENT DOCUMENTS

2019/0071282 A1  3/2019  Zapf
2020/0277732 A1  9/2020  Bosman

FOREIGN PATENT DOCUMENTS

EP        2589959 A2     5/2013
JP      2008247604 A    10/2008
WO   WO-2016/059652 A1   4/2016

* cited by examiner

SENSING FIBER FOR MONITORING ROPE CONDITION, AND METHOD OF MANUFACTURING THE SAME

CROSS-REFERENCE TO RELATED APPLICATIONS

This application claims priority to and the benefit of U.S. Provisional Patent Application No. 63/325,264, titled "Sensing Fiber for Monitoring Rope Condition, and Method of Manufacturing the Same" and filed on Mar. 30, 2022, the entire contents of which are hereby incorporated by reference herein.

STATEMENT REGARDING FEDERALLY SPONSORED RESEARCH OR DEVELOPMENT

This invention was made with U.S. Government support under Agreement Number W15QKN-16-3-0001 awarded by the Army Contracting Command-New Jersey (ACC-NJ). The Government has certain rights in the invention.

BACKGROUND

High-strength synthetic fiber (e.g., polymeric, elastomeric, plastomeric, Dyneema/UHMWPE, and the like) rope is frequently used as a substitute for steel wire, metal, and the like ropes, tethers, and/or cables. For example, in comparison with steel ropes or cables, synthetic fiber rope has eighty percent less weight; has about ten percent greater loading capacity; places less wear or no wear on crane components, such as sheaves and drums; enjoys a longer lifetime; does not require lubrication (hence it is more environmentally friendly); and is easier to handle.

However, thermoplastic compounds, such as synthetic fiber rope, are subject to degradation (e.g., fatigue, creep, elongation, etc.) as a function of different variables (e.g., time, temperature, etc.). Indeed, synthetic fiber rope has a useful life that is affected by, inter alia, environmental conditions (e.g., weather, temperature, and the like), the loads it carries, and the duration of time the rope is subjected to these loads. Such factors, when taken alone or together, quantify the rope's discard criteria. Once the discard criteria has been met or exceeded, the rope has reached a certain level of degradation, at which point the rope should be discarded and replaced. As a result, monitoring the condition of the synthetic rope to ascertain when any of the rope's discard criteria have been met is desirable.

SUMMARY

Disclosed herein are improved techniques for monitoring the condition or performance of a rope or cable.

At least one aspect of the present disclosure is directed to a system for monitoring performance of a rope. The system includes a drawn form factor that has a plurality of radio-frequency identification (RFID) devices (e.g., embedded therein). The form factor is integrated into a core portion of the rope. Each RFID device is configured to transmit a corresponding message to at least one receiver in response to an interrogation initiated by at least one transmitter. The messages enable the determination of at least one characteristic of the rope based on a spatial relationship of the plurality of RFID devices and a timing of the received messages.

Various embodiments of this aspect of the disclosure may include the following features. In some embodiments, the at least one characteristic of the rope is creep or an elongation of the rope. The plurality of RFID devices may be linearly dispersed in the form factor. For example, consecutive RFID devices may have a substantially uniform spacing or a non-uniform spacing. In some embodiments, the message transmitted by each RFID device includes an identifier of the corresponding RFID device.

In various embodiments, at least one RFID device of the plurality of RFID devices includes at least one sensor, such as a temperature sensor. In some embodiments, the system includes a first transmitter configured to initiate interrogation of the plurality of RFID devices by transmitting energy to the plurality of RFID devices and a first receiver configured to receive the corresponding messages transmitted by the plurality of RFID devices. As an example, the first transmitter and the first receiver may be included in a first transceiver.

In some embodiments, the system also includes at least one first antenna coupled to the first transmitter and the first receiver. The at least one first antenna may be positioned relative to the rope to provide an optimal readout window. In some embodiments, the optimal readout window is less than a spacing between consecutive RFID devices. The amount of energy transmitted by the first transmitter may be adjustable based on the position of the at least one first antenna.

The system may also include a sensor configured to measure a speed of the rope, which may be for use in determining the at least one characteristic of the rope.

The message transmitted by each RFID device may be carried via a return signal received by the first receiver. In some embodiments, the first transmitter is configured to initiate an interrogation of a first RFID device of the plurality of RFID devices and a second RFID device of the plurality of RFID devices in parallel. In such cases, a phase difference between the two return signals received at the first receiver may be for use in determining the at least one characteristic of the rope. Moreover, the first and second RFID devices may be consecutive devices. In other embodiments, the first transmitter is configured to initiate an interrogation of a first RFID device (i) at a first time to produce a first return signal and (ii) at a second time to produce a second return signal. A phase difference between the first and second return signals may be for use in determining a speed of the rope, which itself may be for use in determining the at least one characteristic of the rope.

In various embodiments, the system also includes a second transmitter configured to initiate an interrogation of the plurality of RFID devices by transmitting energy to the plurality of RFID devices, a second receiver configured to receive the corresponding messages transmitted by the plurality of RFID devices, and at least one second antenna coupled to the second transmitter and the second receiver. The second transmitter and the second receiver may be included in a second transceiver. In some embodiments, the at least one first antenna and the at least one second antenna are separated by a fixed distance, and the fixed distance and the timing of the received messages from the plurality of RFID devices may be for use in determining a speed of the rope.

Another aspect of the present disclosure is directed to a system for monitoring a condition of a rope. The system includes a drawn form factor having a plurality of radio-frequency identification (RFID) devices that are each coupled to at least one corresponding sensing element. The form factor is integrated into a core portion of the rope. Each RFID device is configured to transmit measurement data, collected by the at least one corresponding sensing element, to at least one receiver in response to an interrogation initiated by at least one transmitter.

Various embodiments of this aspect of the disclosure may include the following features. The at least one sensing element may include a strain gauge, a temperature sensor, a pressure sensor, and/or an accelerometer. The at least one sensing element may be a passive device. The RFID devices may be linearly dispersed in the form factor. For example, consecutive RFID devices may have a substantially uniform spacing or a non-uniform spacing.

In some embodiments, the measurement data provides an indication of at least one characteristic of the rope, such as its creep or its elongation. In some embodiments, the measurement data enables the determination of the at least one characteristic of the rope. In some embodiments, each RFID device is configured to transmit the measurement data in a message, and the message may include an identifier of the RFID device.

In some embodiments, the system also includes a transmitter configured to initiate an interrogation of the plurality of RFID devices by transmitting energy to the plurality of RFID devices and a receiver configured to receive the corresponding messages transmitted by the plurality of RFID devices. As an example, the transmitter and receiver may be included in a transceiver. In some embodiments, the system also includes at least one antenna coupled to the transmitter and the receiver. The at least one antenna may be positioned relative to the rope to provide an optimal readout window. In some embodiments, the optimal readout window is less than a spacing between consecutive RFID devices. The amount of energy transmitted by the transmitter may be adjustable based on the position of the at least one antenna. In some embodiments, the at least one antenna is configured to move with respect to the rope.

Yet another aspect of the present disclosure is directed to a method of manufacturing a form factor capable of being integrated into a rope for the purpose of monitoring a condition of the rope. The method includes positioning a radio-frequency identification (RFID) device and at least one sensing element within a pocket of a preform material and drawing the form factor by causing the preform material to flow. The drawing step embeds the RFID device and the at least one sensing element within the drawn form factor.

In various embodiments of this aspect of the disclosure, the RFID device is coupled to the at least one sensing element. In other embodiments, the at least one sensing element is included within the RFID device. In some embodiments, the RFID device includes an RFID device die. In such cases, positioning the RFID device within the pocket of the preform material may include coupling the RFID device die to a wire in the preform material. In various embodiments, the method also includes attaching an antenna to the RFID device die embedded within the drawn form factor. In some cases, the antenna is electrically coupled to the RFID device die. In other embodiments, the method includes creating at least one discontinuity in the wire such that a portion of the wire coupled to the RFID device die forms an antenna. In some embodiments, the method also includes creating at least one discontinuity in the wire such that the RFID device die is electrically isolated from a remaining portion of the wire.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from the foregoing and the following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

DETAILED DESCRIPTION

As discussed above, it is beneficial to monitor the condition of synthetic ropes to ascertain when any of the rope's discard criteria has been met. Consequently, it would be desirable to provide a rope condition monitoring system that includes one or more monitoring devices (e.g., RFID devices) that enable at least one characteristic of the rope to be monitored (e.g., elongation, fatigue, creep, etc.). In some examples, the monitoring devices include one or more sensors that enable sensing and recording of different parameters (e.g., temperature, strain, etc.). In some examples, such parameters are used to understand non-linear relationships between the parameters (e.g., temperature) and different rope characteristics (e.g., creep) due to the use of the rope and, hence, of refining the discard criteria. Moreover, it would be desirable to provide such a rope condition monitoring system that is capable of acquiring monitoring data concurrently and while the rope is in use. Although the embodiments of the present disclosure will be described, such that the monitoring devices are RFID devices, that is done for illustrative purposes only. The embodied monitoring devices will have multiple functions that leverage existing radio frequency communications protocol.

For the purpose of this description, the term "rope" will refer to a bundle of filaments consisting essentially of one or more fibers that are subject to carrying a load. Illustrative, but not exhaustive, examples of a "rope" may include: a cable, cord, or tension member. For the purpose of illustration rather than limitation, synthetic fibers may include one or more of: a polymer, an elastomer, UHMWPE, Nylon®, Polyester, Aramid, carbon fiber, glass, and the like. While the some embodiments of the present disclosure are described in connection with use with a lifting crane, that application is provided for the purpose of illustration not limitation. Other applications would be intuitively obvious to those of ordinary skill in the art and may include, for example, elevators, anchor vessels, tether systems (for undersea applications), and so forth.

Method of Manufacture of a Form Factor Having Distributed Monitoring Devices.

A method of manufacturing a form factor (e.g., a fiber) having a plurality of monitoring devices (e.g., RFID devices) disposed at various or random locations in the form factor is disclosed. In some embodiments, the method of manufacture involves a fiber draw process that includes drawing thermoplastic fibers containing one or more RFID devices. In some examples, each RFID devices includes (or is otherwise coupled to) one or more sensing elements (e.g., a temperature sensor). Advantageously, the thermoplastic fibers may be drawn using standard thermoplastic draw techniques, such that a plurality of RFID devices may be drawn and embedded in a single fiber. In some embodiments, the steps involved in the draw process include preparing a preform and then drawing the fiber.

Figure 1:
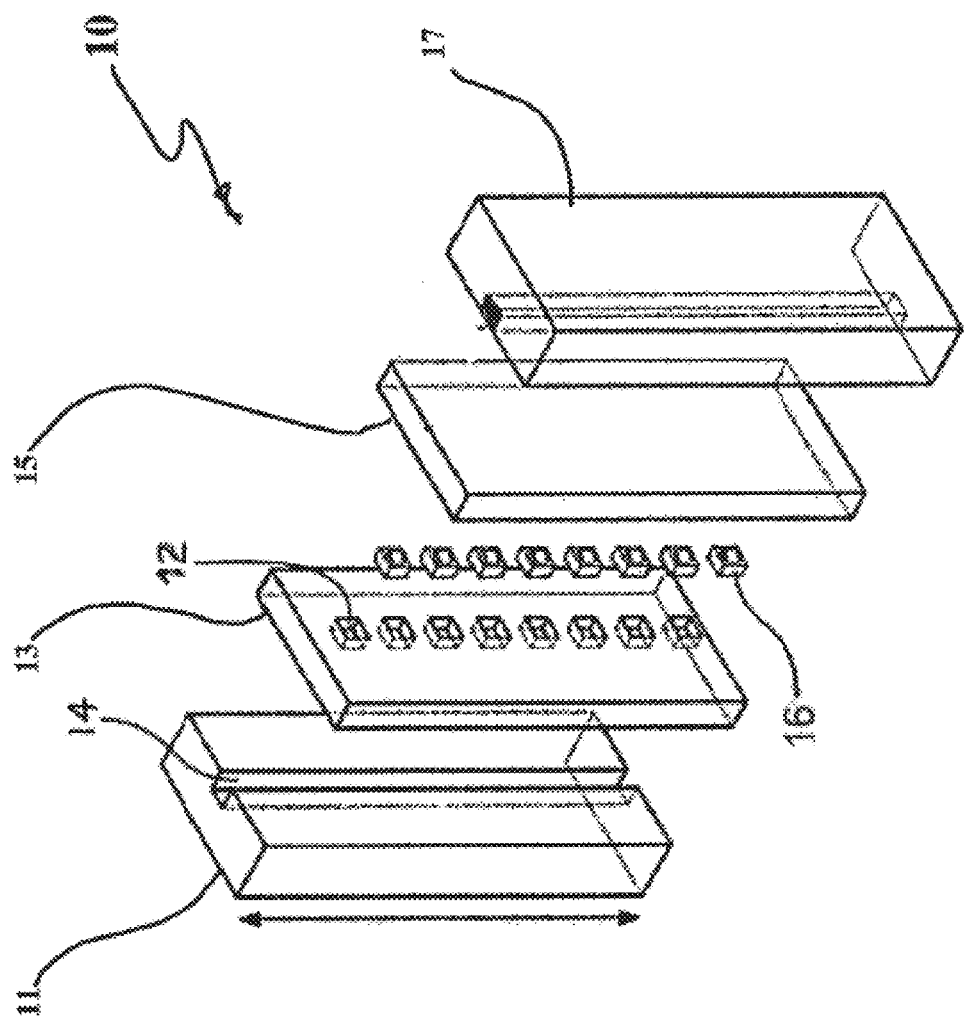
FIG. 1 is an illustration of a preform for manufacturing a form factor having distributed monitoring devices, in accordance with some embodiments.
Figure 2:
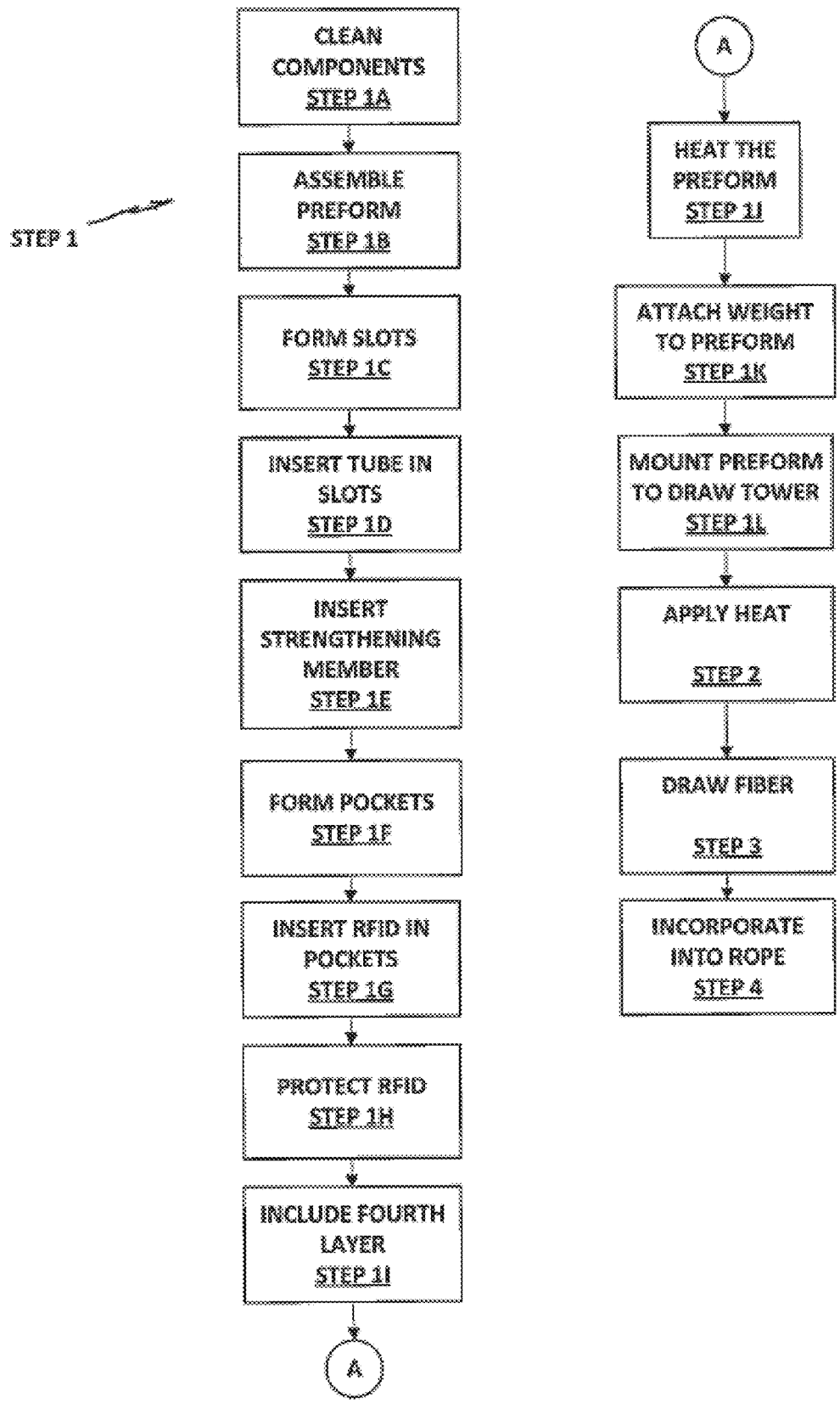
FIG. 2 is a flow diagram of a method for manufacturing a form factor having distributed monitoring devices, in accordance with some embodiments.

For example, referring to FIGS. 1 and 2, in some applications, to prepare the preform 10 (STEP 1), a rectangular or square preform 10 may be assembled (STEP 1B) using sheets and bars 11, 13, 15, 17 of a thermoplastic material that, preferably, satisfies optical and mechanical specifications of the end application. Exemplary thermoplastic materials include, for the purpose of illustration and not limitation: polycarbonate (PC), polyarylsulfones (PSU), polyetherimide (PEI), polyethylene terephthalate (PET), cyclic olefin copolymer (COC), and the like. Prior to or while a preform 10 is being assembled (STEP 1B), the components of the preform 10 may be cleaned and moisture removed (STEP 1A). Moisture may be removed (STEP 1A) from the preform components 11, 13, 15, 17 in advance of preform assembly (STEP 1B), for example, by drying in a vacuum oven at elevated temperature (e.g., 50-150 degrees Centigrade (° C.)) for 1-2 weeks.

In a process known as consolidation (STEP 1), the component pieces or layers 11, 13, 15, 17 of the preform 10 may be stacked together (STEP 1B) and heated (e.g., to the glass transition temperature of the thermoplastic material) (STEP 1J) using, for example, a hot press or similar device in order to fuse, e.g., by heat and pressure, the various layers 11, 13, 15, 17 together. In some embodiments, a slot 14 for any elongate strengthening members may be formed (e.g., slot-milled) through the longitudinal length of a first layer 11 of the preform 10 (STEP 1C). In some variations, to prevent a slot 14 from collapsing during subsequent consolidation steps, a (e.g., PTFE or the like) tube may be inserted into the slot 14 (STEP 1D) freshly formed in the first layer 11. Once the slot 14 has been completely prepared (STEP 1C), any inserted tube(s) may be removed and an elongate strengthening member 18 (see FIG. 3) installed in or passed through the slot 14 (STEP 1E).

In a second component piece or layer 13, a plurality of pockets 12 for the RFID devices 16 may also be formed (e.g., end-milled) (STEP 1F), preferably in the upper face of the preform layer 13, at various locations. Once the pockets 12 have been formed (STEP 1F), RFID devices 16 may be installed in each pocket 12 (STEP 1G). In some examples, each RFID device 16 is a packaged device including an RFID device die and an antenna. In some examples, each RFID device 16 is an RFID device die configured to be coupled to an external antenna.

To protect the RFID devices 16 during the draw process, a third component piece or layer 15 (e.g., a, thermoplastic, PC, PEI, eCOC, SEBS, and the like) sheet may be placed over the RFID devices 16 (STEP 1H) and the exposed pocket openings 12 on the upper face of the second component piece or layer 13 of the preform 10. A fourth component piece or layer 17 may then be integrated into the preform 10 (STEP 1I). Optionally, small holes for mounting the preform 10 to the handle of the draw tower 20 (see FIG. 3) may be installed (e.g., drilled) into one end of the preform 10. To complete the consolidation process, the preform 10 may be heated (STEP 1J) so that the assembled component pieces or layers 11, 13, 15, 17 are attached to one another.

As an alternative, a hybrid construction process in which components (e.g., conductors, functional fibers, optical fibers, strengthening members (e.g., Kevlar)) that are disposed in a larger fibers of cable-like construction may be overcoated with, for example, thermoplastic, PC, PEI, eCOC, SEBS, and the like.

Figure 4:
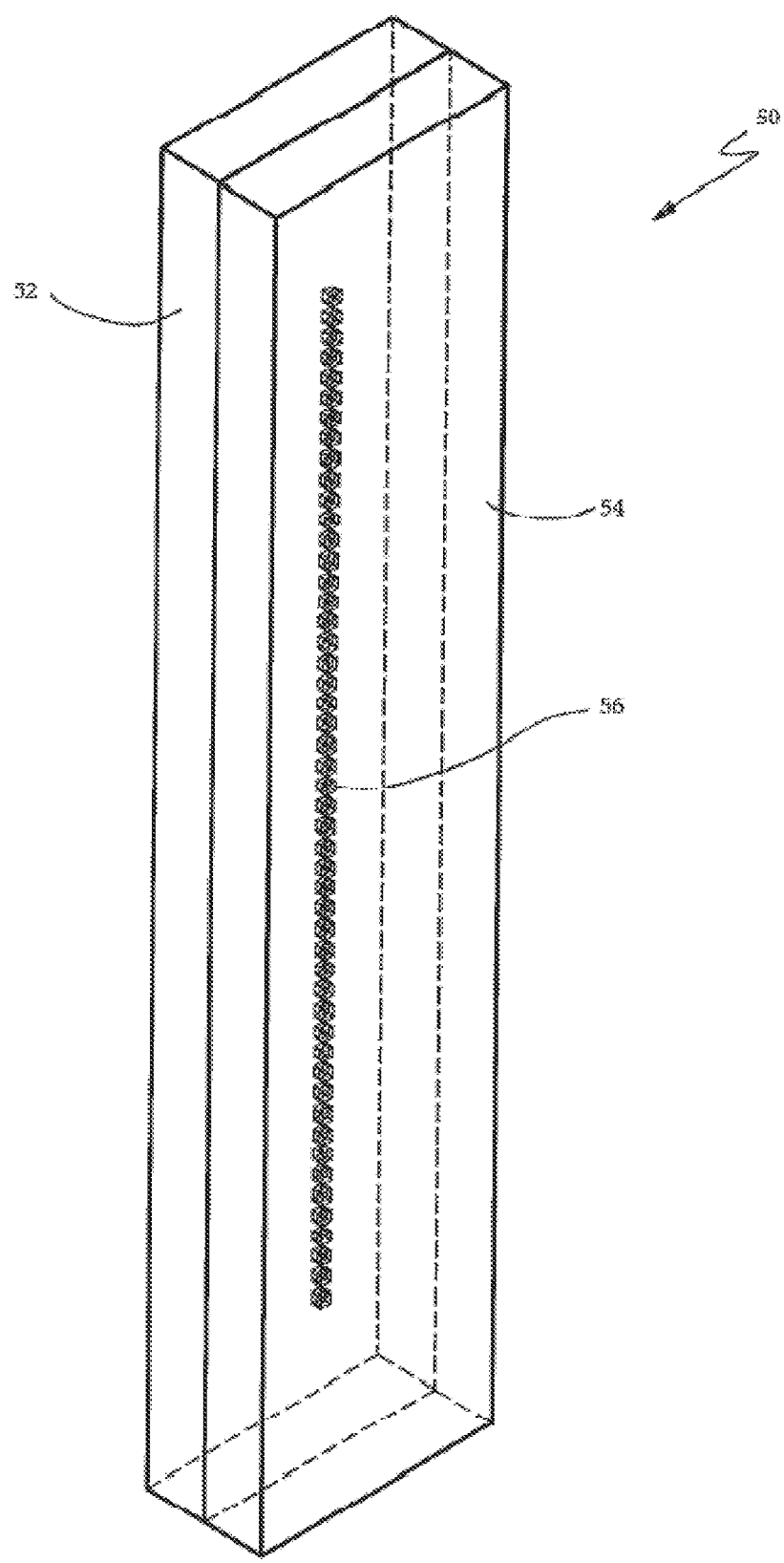
FIG. 4 is an illustration of a preform for manufacturing a form factor having distributed monitoring devices, in accordance with some embodiments.

Although the invention has been described as having a preform 10 having four component pieces or layers 11, 13, 15, 17, that is done for illustrative purposes only. Preforms 10 may be prepared that have fewer or more than four component pieces or layers. The presence and relative locations of the component pieces or layers 13, 15 are provided to encapsulate the RFID devices 16 to prevent them from falling out of the preform 10 during the draw process. They also provide a physical barrier between and that separates the RFIDs 16 from the elongate strengthening member 18. As shown in FIG. 4, for example, in a separate embodiment, the preform 50 could include two component pieces or layers 52, 54 with the elongate strengthening member disposed in one of the component pieces or layers (not shown). The RFID devices 16 may be sandwiched between the two halves 52, 54 before the preform 50 is introduced into the draw tower 20 (see FIG. 2).

In another embodiment, additional slots 14 may be milled in one or more of the component pieces or layers for the purpose of installing fibers (e.g., tungsten wire, Kevlar wire, and so forth) with a strong tensile strength than the conductive wires for the purpose of increasing the overall tensile strength of the drawn fiber. Furthermore, slots 14 and elongate strengthening member 18 would not be necessary if the tensile strength of the preform 10 polymer material is sufficient to support the weight of the drawn fiber with the incorporated RFID devices 16.

Figure 3:
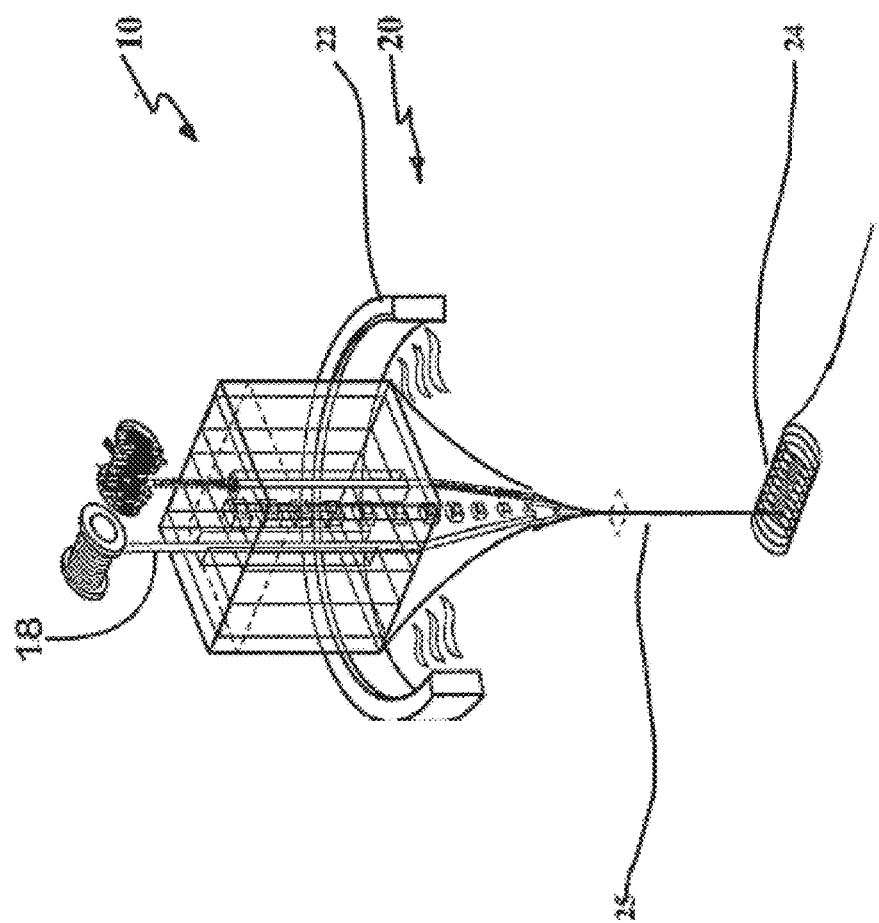
FIG. 3 is an illustration of a system in the process of manufacturing a form factor having distributed monitoring devices, in accordance with some embodiments.

Referring to FIGS. 2 and 3, once the preform 10 containing a plurality of RFID devices 16 has been assembled, a weight or body of mass capable of drawing the preform 10 may be suspended from or mounted to the preform 10 (STEP 1K) and, subsequently, the weight and preform 10 may then be mounted to a draw tower 20 (STEP 1L), for example, within a three-zone furnace 22. An elongate strengthening member 18 may be inserted into the slot 14 and attached to the weight or body mass, such that, as the weight or body mass draws the heated thermoplastic material, it also draws the elongate strengthening member 18 in the resulting factor form (i.e., fiber) 25.

The thermoplastic material of the preform 10 may then be heated (e.g., at a temperature of about 80 to 300° C.) (STEP 2) until it begins to flow under the force of the weight or mass body attached to the bottom of the preform 10. As the fiber 25 is drawn (STEP 3) from the preform 10, the distance between the RFID devices 16 increases and the RFID devices 16 are distributed over the length of the resulting drawn fiber 25.

The drawn fiber 25 emerging from the furnace 22 may then be attached to a capstan/winder system 24, which winds the fiber 25 at a controlled rate. The temperature of the furnace 22 coupled with the winding rate and the rate at which the preform 10 is lowered into the furnace 22 controls the overall diameter of the fiber 25.

Rope manufacturing often starts with a core, which serves as the main strength member upon which additional layers are added by twisting or braiding multiple yarns/filaments to increase tensile strength, abrasion resistance, and torque balance. These ropes are made in batches of thousands of continuous meters and are then cut down to size. The fiber draw process described above packages and distributes RFID devices 16 into a form factor (e.g., a fiber) that has similar cross-sectional area, lengths, and tensile strengths such that the fiber can be incorporated in the rope (STEP 4) as another yarn or filament with minimal modifications to existing processes and equipment.

In some examples, rather than including the RFID devices in the preform material, the RFID devices may be attached after the form factor has been drawn. For example, one or more strands of a conductive (e.g., copper, tungsten, aluminum, and the like) wire may be positioned within a conduit provided in a preform material. A form factor is then thermally drawn by applying heat to the preform material, causing the preform material to flow. Once drawn, at least one pocket is created in the form factor to expose the conductive wire. An electrically-connectable device (e.g., an RFID device) is positioned within each pocket and electrically coupled to the exposed wire. Additional details relating to the above manufacturing steps can be found in U.S. Patent Application Publication No. 2021/0395928, published Dec. 23, 2021 and titled "Multi-Material Fibers and Methods of Manufacturing the Same," and in U.S. Patent Application Publication No. 2021/0362396, published Nov. 25, 2021 and titled "Multi-Material Fibers and Methods of Manufacturing the Same," both of which are hereby incorporated by reference in their entireties.

In one example, each RFID device is a packaged device including an RFID device die and an antenna. In such examples, discontinuities in the conductive wire may be created such that each RFID device is electrically isolated from a remaining portion of the wire and/or the other RFID devices. For example, a discontinuity (or break) in the wire may be formed between two consecutive RFID devices such that the two RFID devices are not electrically connected. In other examples, each RFID device is an RFID device die. As such, an external antenna may be coupled to each RFID device die. In some examples, discontinuities in the conductive wire may be created to produce antennas that are coupled to each RFID device die. For example, a discontinuity (or break) in the wire may be formed between two consecutive RFID devices such that the remaining portions of the wire form antennas for each of the RFID devices. In some examples, the discontinuities are created using a knife or laser that is configured to sever the wire without damaging the form factor (e.g., severing the polymeric cladding).

Alternative Method of Manufacture of a Form Factor Having Distributed Monitoring Devices.

Figure 5:
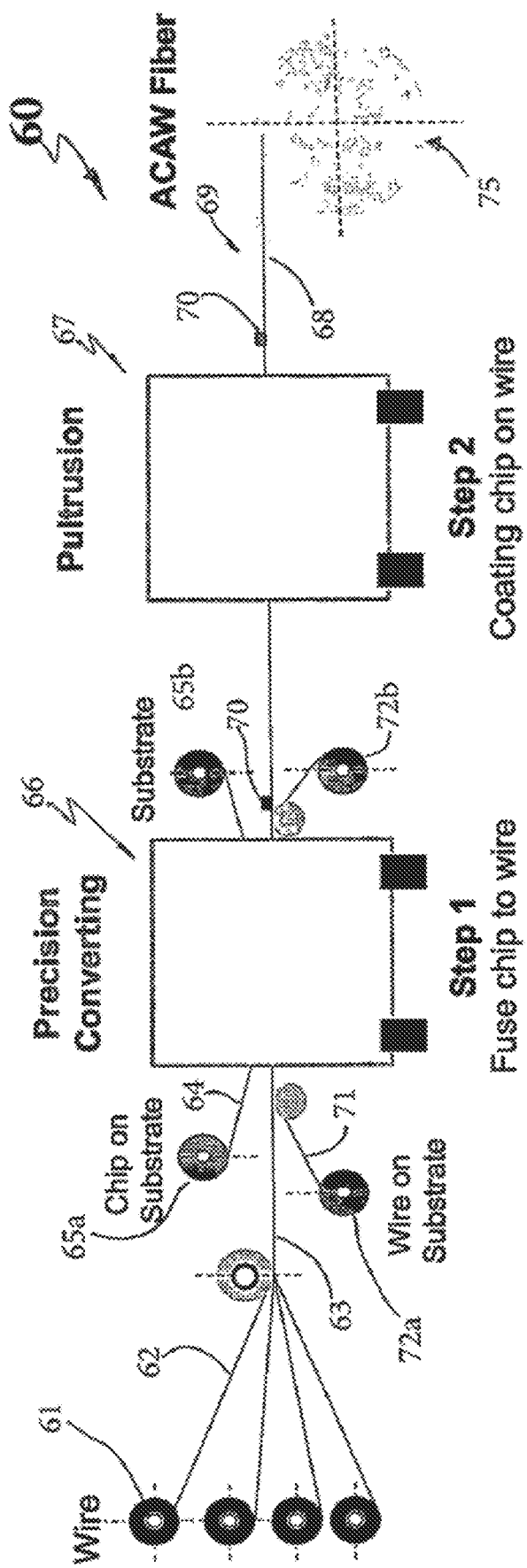
FIG. 5 is an illustration of a process for manufacturing a form factor having distributed monitoring devices, in accordance with some embodiments.
Figure 6:
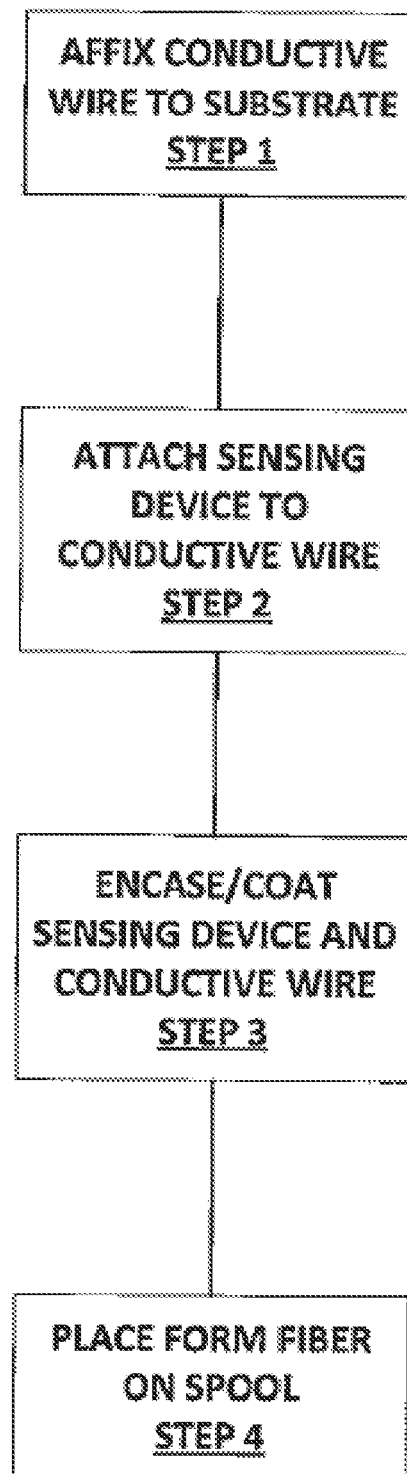
FIG. 6 is a flow diagram of a method for manufacturing a form factor having distributed monitoring devices, in accordance with some embodiments.

As an alternative to manufacturing a form factor with distributed monitoring devices using a thermal draw process, a form factor may be manufactured in a roll-to-roll process as shown in FIGS. 5 and 6, which show an exemplary schematic of a manufacturing system and a flow chart method of manufacture, respectively.

Referring to FIG. 6, in a first step, one or more strands of a conductive (e.g., copper, tungsten, aluminum, and the like) wire 62 may be drawn from a spool 61 and affixed, attached, and so forth, e.g., in a side-by-side configuration, to a substrate 63 (STEP 1). Although FIG. 5 shows four conductive wires 62 unrolling from four spools 61, this is done for illustrative purposes only. Those of ordinary skill in the art can appreciate that any number of wires 62 may be affixed/attached to any number of substrates 63 in any desired configuration.

The substrate 63 with affixed/attached conductive wires 61 may then introduced into a (e.g., roll to roll) precision converting unit 66 in which the monitoring devices 70 can be attached to the conductive wires 62 at precise, desired locations (STEP 2). For the purpose of illustration, rather than limitation, the monitoring devices 70 may be attached to the conductive wires 62 using a conductive epoxy, using an anisotropic conductive tape, with solder and heat, and so forth. More particularly, as shown in FIG. 5, in a first implementation, the monitoring devices 70 may be loosely or releasably attached to (e.g., the underside of) a chip substrate 64 (e.g., polymeric film, polymeric tape, and the like) and fed into the precision converting unit 66 (e.g., a reflow oven and the like) using the chip substrate 64. At the precise or desired location, a force may be applied to the monitoring devices 70 to cause them to release from the chip substrate 64. Subsequently or contemporaneously, the monitoring device 70 may be fixedly affixed or attached to the substrate 63.

Advantageously, the chip substrate 64 (e.g., polymeric film, polymeric tape, and the like) may be disposed on a first spool 65a near the inlet of the precision converting unit 66. A second spool 65b may be disposed at or near the outlet of the precision converting unit 66 for recovering the chip substrate 64. Indeed, the second spool 65b recovers the chip substrate 64 after the monitoring device 70 has been affixed or attached to the conductive wires 62 disposed on the substrate 63.

Once the monitoring device 70 has been affixed or attached to the conductive wires 62 disposed on the substrate 63, the substrate 63 may be fed into a pultrusion device 67, in which the monitoring device 70 and conductive wires 62 may be encased or coated in a polymeric material 68 (STEP 3). Exemplary methods of encasing or coating the monitoring device 70 and conductive wires 62 may include, for the illustrative purposes only, a hot process or a process that include ultraviolet (UV) curing. Once encased, the resulting fiber 69 may be rolled on a spool 69 (STEP 4) for transportation and use.

In an alternative implementation, the spools 61 and substrate 64 may not be necessary; rather, the monitoring devices 70 may be disposed on a chip substrate 64 as previously described, however, the corresponding conductive wires 62 may be disposed in a desired orientation on a ribbon-like substrate 71 (e.g., PET, Compton film, polyimide, and the like). In this implementation, the ribbon-like substrate 71 may be disposed on a first spool 72a near the inlet of the precision converting unit 66. A second spool 72b may be disposed at or near the outlet of the precision converting unit 66 for recovering the ribbon-like substrate 71, from which the conductive wires 62 have been removed. The free running end of the conductive wires 62 would extend through the precision converting unit 66, the pultrusion device 67, and wound on the spool 75.

As shown in FIG. 5, the monitoring devices 70 loosely or releasably attached to (e.g., the underside of) a chip substrate 64 and the ribbon-like substrate 71, on which the conductive wires 62 are arranged, are fed into the precision converting unit 66 (e.g., a reflow oven and the like). At the precise or desired location, a force may be applied to the monitoring devices 70 to cause them to release from the chip substrate 64. Subsequently or contemporaneously, the monitoring device 70 may be fixedly affixed or attached to the conductive wires 62.

Once the monitoring device 70 has been affixed or attached to the conductive wires 62 disposed on the substrate 71, the substrate 63 and conductive wires 62 may be fed into a pultrusion device 67, in which the monitoring device 70 and conductive wires 62 may be encased or coated in a polymeric material 68 (STEP 3). Exemplary methods of encasing or coating the monitoring device 70 and conductive wires 62 may include, for the illustrative purposes only, a hot process or a process that include ultraviolet (UV) curing. Once encased, the resulting fiber 69 may be rolled on a spool 75 (STEP 4) for transportation and use.

Systems for Monitoring the Condition of a Rope.

Figure 7:
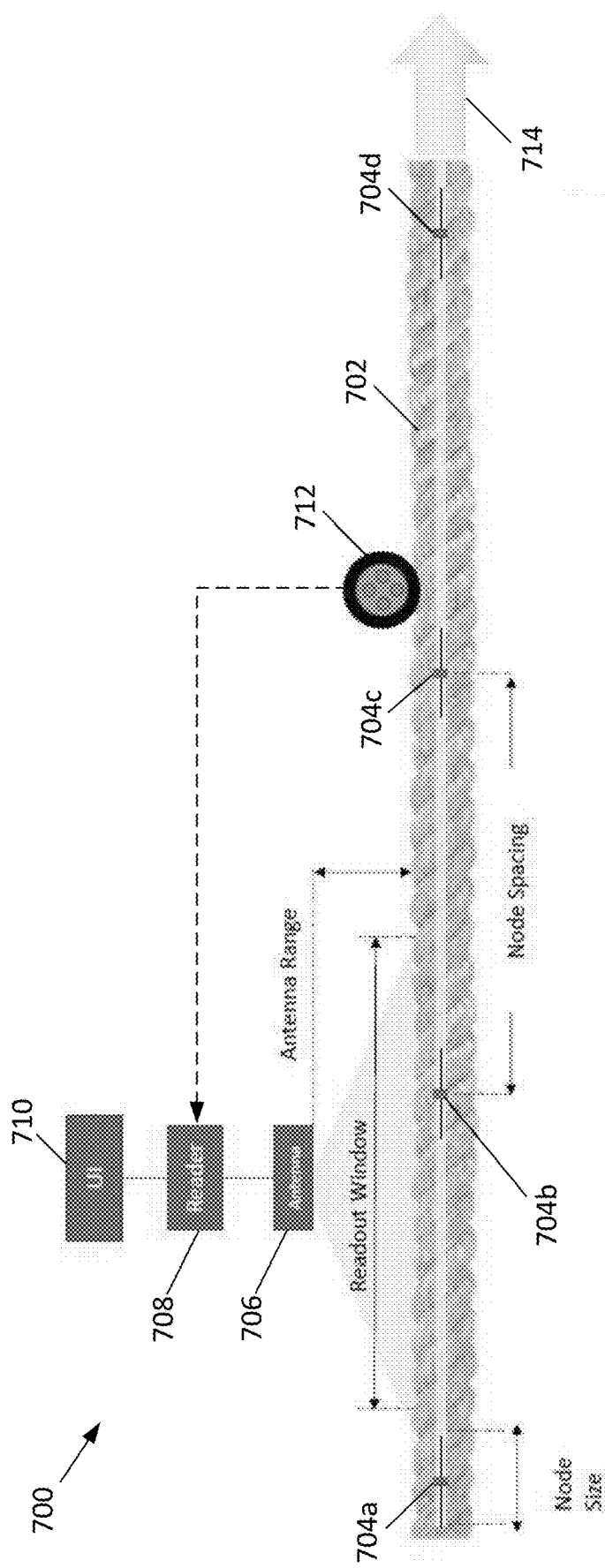
FIG. 7 is an illustration of a rope monitoring system, in accordance with some embodiments.

FIG. 7 illustrates a rope monitoring system 700 in accordance with aspects described herein. In one example, the system 700 is configured to monitor a rope 702 that includes a plurality of RFID devices 704. In some examples, the system 700 includes at least one antenna 706, a reader 708, and a user interface (UI) 710. In some examples, the UI 710 is presented via a display on the reader 708. In some examples, the UI 710 is presented via another device in communication with the reader 708 (e.g., a computer, cell phone, tablet, etc.).

In one example, the plurality of RFID devices 704 are included in a drawn form factor of the rope 702. In some examples, the form factor is integrated into a core portion of the rope 702. In some examples, the plurality of RFID devices 704 are linearly dispersed in the form factor of the rope 702. In one example, the plurality of RFID devices 704 may be dispersed such that consecutive RFID devices have a substantially uniform spacing. In other examples, consecutive RFID devices may have a non-uniform spacing.

While not shown, the reader 708 includes a transmitter and a receiver. In some examples, the reader 708 includes a transceiver that includes the transmitter and receiver. The transmitter is configured to transmit energy to initiate an interrogation of each RFID device. Likewise, the receiver is configured to receive energy transmitted back from each RFID device. In one example, the transmitter and the receiver are coupled to the at least one antenna 706 to transmit/receive energy. In some examples, the transmitter and receiver are coupled to a common antenna. In other examples, the transmitter and receiver are coupled to different antennas.

In some examples, the antenna 706 has a readout window corresponding to the beamwidth of the antenna 706 and the antenna range (e.g., the distance between the antenna 706 and the rope 702). The readout window may be decreased by moving the antenna 706 closer to the rope 702. Likewise, the readout window may be increased by moving the antenna 706 away from the rope 702. In some examples, the amount of energy transmitted by the antenna 706 is adjusted based on the position of the antenna. For example, if the antenna 706 is positioned farther away from the rope 702, the energy level may be increased. Likewise, if the antenna is positioned closer to the rope 702, the energy level may be decreased. In some examples, the amount of energy transmitted by the antenna 706 is adjusted based, at least in part, on the configuration of each RFID device antenna and/or the RFID device density across the rope 702.

In one example, the antenna 706 is positioned relative to the rope 702 to provide an optimal readout window. In some examples, the optimal readout window is the maximum (or widest) window that can be achieved without enabling interference from consecutive RFID devices. For example, the optimal readout window may be less than the spacing between consecutive RFID devices of the plurality of RFID devices 704. In some examples, the directivity pattern of the antenna 706 enables the optimal readout window to be larger than the spacing between consecutive RFID devices. For example, the optimal readout window may be achieved when the half-power (or 3 dB) beamwidth of the antenna 706 is less than the spacing between consecutive RFID devices.

When interrogated by the transmitter, each RFID device of the plurality of RFID devices 704 transmits a message back to the receiver (e.g., via the antenna 706). In one example, the message includes an identifier of the corresponding RFID device (e.g., RFID1, RFID2, etc.). In some examples, each RFID device includes or is coupled to at least one sensing element (e.g., a temperature sensor, strain gauge, etc.). In such examples, the message may include measurements (or other data) collected by the at least one sensing element. In some examples, the messages received at the receiver enable the determination of at least one characteristic of the rope 702 (e.g., creep, elongation, etc.). In one example, the determination is based on the spatial relationship of the plurality of RFID devices 704 and a timing of the received messages. In some examples, the spatial relationship between the plurality of RFID devices 704 represents the initial (or expected) spacing between the RFID devices. The spatial relationship may be determined based on the spacing parameter used to manufacture the rope 702 and/or based on an initial characterization of the rope 702.

In some examples, the reader 708 includes at least one processor or controller configured to determine the at least one rope characteristic. In other examples, a different processor or controller in communication with the reader 708 is configured to perform the determination of the rope characteristic(s). In some examples, the system 700 includes a sensor 712 configured to measure the speed of the rope 702 as it is pulled relative to the position of the at least one antenna 706. In such examples, the rope speed may contribute to the determination of the at least one rope characteristics. In one example, measurements from the sensor 712 are provided to the reader 708; however, in other examples, the measurements may be provided to a different processor or controller (e.g., associated with the UI 710). In some examples, the rope characteristics are presented to one or more users via the UI 710. The UI 710 may alert the user(s) when the rope characteristics reach (or exceed) the discard criteria for the rope.

Figure 8:
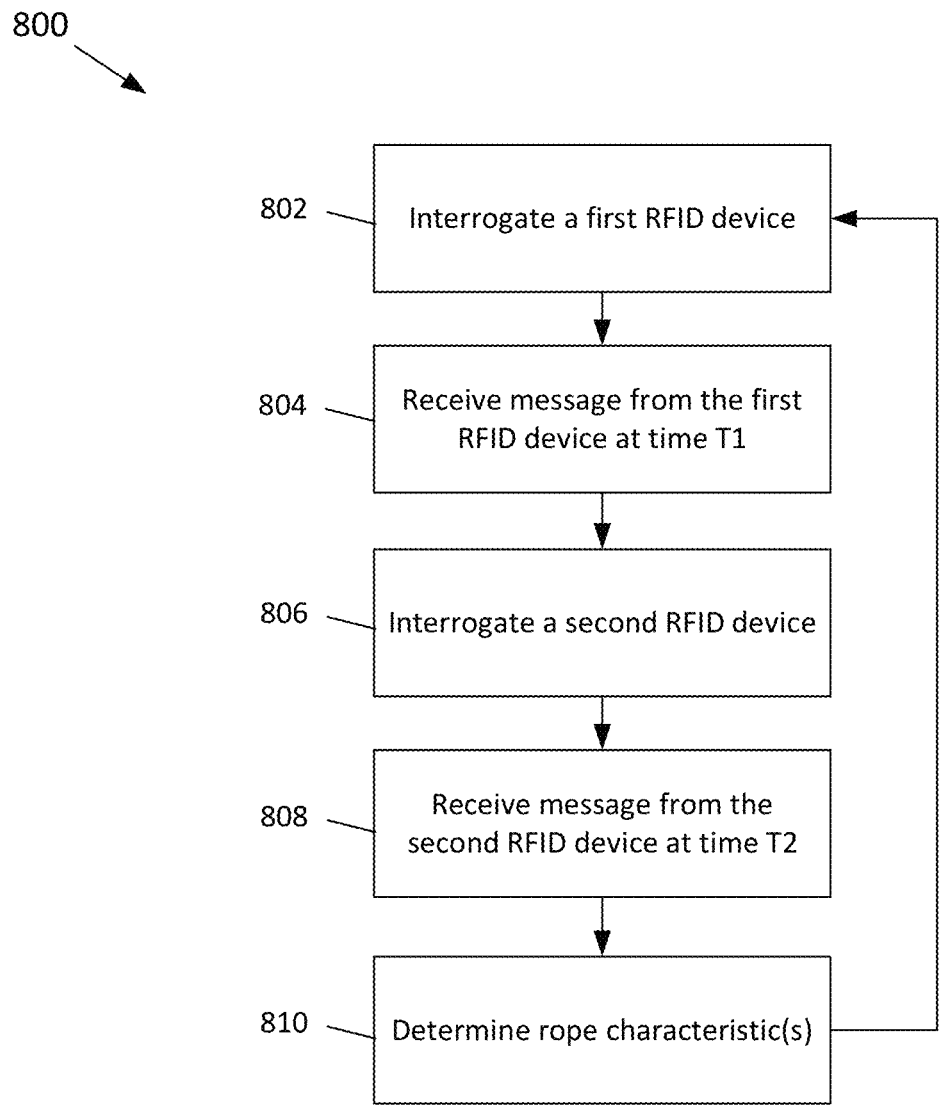
FIG. 8 is a flow diagram of a method for determining characteristics of a rope, in accordance with some embodiments.

FIG. 8 illustrates a method 800 for determining at least one characteristic of a rope. In one example, the method 800 is configured to be carried out by the rope monitoring system 700 of FIG. 7.

At block 802, a first RFID device (e.g., RFID device 704b) is interrogated. In one example, the interrogation of the RFID device 704b is initiated by the transmitter of the reader 708 via the at least one antenna 706. As shown in FIG. 7, the RFID device 704b is interrogated while within the readout window of the antenna 706.

At block 804, a message from the RFID device 704b is received by the receiver of the reader 708 (e.g., via the at least one antenna 706). In one example, the message is received at a first time T1. As discussed above, the message may include an identifier of the RFID device 704b (e.g., RFID1).

At block 806, a second, subsequent RFID device (e.g., RFID device 704a) is interrogated. In one example, the interrogation of the RFID device 704a is initiated by the transmitter of the reader 708 via the at least one antenna 706. The RFID device 704a is interrogated while within the readout window of the antenna 706.

At block 808, a message from the RFID device 704a is received by the receiver of the reader 708 (e.g., via the at least one antenna 706). In one example, the message is received at a second time T2. As discussed above, the message may include an identifier of the RFID device 704a (e.g., RFID2).

At block 810, at least one characteristic of the rope 702 is determined. In some examples, such characteristics include the creep and elongation of the rope 702. In one example, the at least one characteristic is determined based on the spatial relationship of the plurality of RFID devices 704 and a timing of the received messages (e.g., times T1 and T2). In some examples, the speed of the rope (e.g. provided by sensor 712) is used to determine the at least one characteristic. For example, the known (or expected) spacing between the RFID devices 704a, 704b can be derived from the spatial relationship of the plurality of RFID devices 704. The time delta between times T1 and T2, in combination with the rope speed, can be used to measure the actual spacing between RFID devices 704a, 704b. The spacing delta between the known (or expected) spacing and the actual spacing is used to derive characteristics of the rope (e.g., creep, elongation, etc.).

Figure 9:
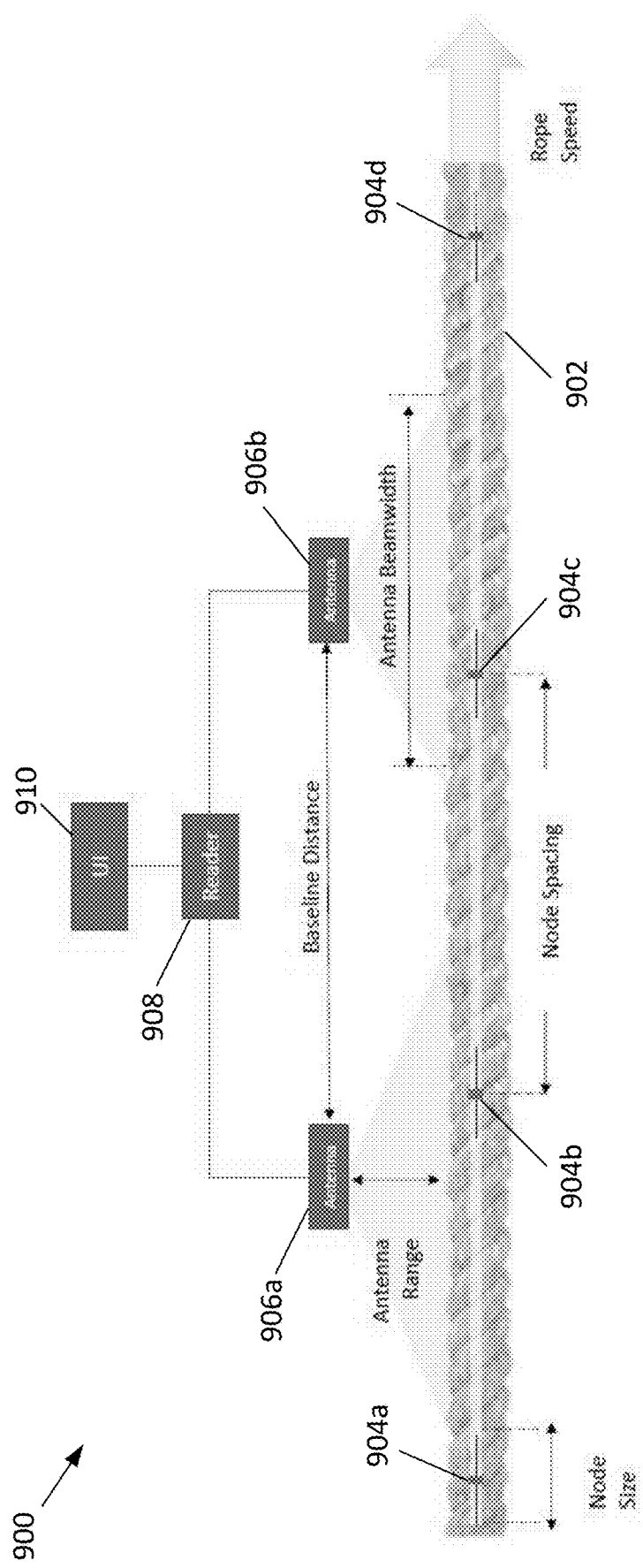
FIG. 9 is an illustration of a rope monitoring system, in accordance with some embodiments.

FIG. 9 illustrates a rope monitoring system 900 in accordance with aspects described herein. In one example, the system 900 is configured to monitor a rope 902 that includes a plurality of RFID devices 904. In some examples, the system 900 includes at least one first antenna 906a, at least one second antenna 906b, a reader 908, and a UI 910. In some examples, the UI 910 is presented via a display on the reader 908. In some examples, the UI 910 is presented via another device in communication with the reader 908 (e.g., a computer, cell phone, tablet, etc.).

In one example, the plurality of RFID devices 904 are included in a drawn form factor of the rope 902. In some examples, the form factor is integrated into a core portion of the rope 902. In some examples, the plurality of RFID devices 904 are linearly dispersed in the form factor of the rope 902. In one example, the plurality of RFID devices 904 may be dispersed such that consecutive RFID devices have a substantially uniform spacing. In other examples, consecutive RFID devices may have a non-uniform spacing.

While not shown, the reader 908 includes a transmitter and a receiver. In some examples, the reader 908 includes a transceiver that includes the transmitter and receiver. The transmitter is configured to transmit energy to initiate an interrogation of each RFID device. Likewise, the receiver is configured to receive energy transmitted back from each RFID device. In one example, the transmitter and the receiver are coupled to the at least one first antenna 906a and the at least one second antenna 906b to transmit/receive energy. In other examples, the reader 908 includes a first transmitter/receiver pair (or transceiver) coupled to the at least one first antenna 906a and a second transmitter/receiver pair (or transceiver) coupled to the at least one second antenna 906b. In some examples, the system 900 may include multiple readers.

In some examples, the antennas 906a, 906b each have a readout window corresponding to the beamwidth of the antenna and the antenna range (e.g., the distance between the antenna and the rope 902). The readout window of each antenna may be decreased by moving the antenna closer to the rope 902. Likewise, the readout window of each antenna may be increased by moving the antenna away from the rope 902. In some examples, the amount of energy transmitted by each antenna is adjusted based on the position of the antenna. For example, if the antenna is positioned farther away from the rope 902, the energy level may be increased. Likewise, if the antenna is positioned closer to the rope 902, the energy level may be decreased. In some examples, the amount of energy transmitted by the antennas 906a, 906b is adjusted based, at least in part, on the configuration of each RFID device antenna and/or the RFID device density across the rope 902.

In one example, each antenna 906a, 906b is positioned relative to the rope 902 to provide an optimal readout window. In some examples, the optimal readout window is the maximum (or widest) window that can be achieved without enabling interference from consecutive RFID devices and the other antenna. In some examples, a fixed baseline distance is established based on the positioning of the antennas 906a, 906b. The fixed baseline distance corresponds to the spacing between the antennas 906a, 906b.

When interrogated by the transmitter, each RFID device of the plurality of RFID devices 904 transmits a message back to the receiver (e.g., via the antennas 906a, 906b). In one example, the message includes an identifier of the corresponding RFID device (e.g., RFID1, RFID2, etc.). In some examples, each RFID device includes or is coupled to at least one sensing element (e.g., a temperature sensor, strain gauge, etc.). In such examples, the message may include measurements (or other data) collected by the at least one sensing element. In some examples, the messages received at the receiver enable the determination of at least one characteristic of the rope 902 (e.g., creep, elongation, etc.). In one example, the determination is based on the spatial relationship of the plurality of RFID devices 904 and a timing of the received messages. In some examples, the spatial relationship between the plurality of RFID devices 904 represents the initial (or expected) spacing between the RFID devices. The spatial relationship may be determined based on the spacing parameter used to manufacture the rope 902 and/or based on an initial characterization of the rope 902. In some examples, the reader 908 includes at least one processor or controller configured to determine the at least one rope characteristic. In other examples, a different processor or controller in communication with the reader 908 is configured to perform the determination of the rope characteristic(s).

Figure 10:
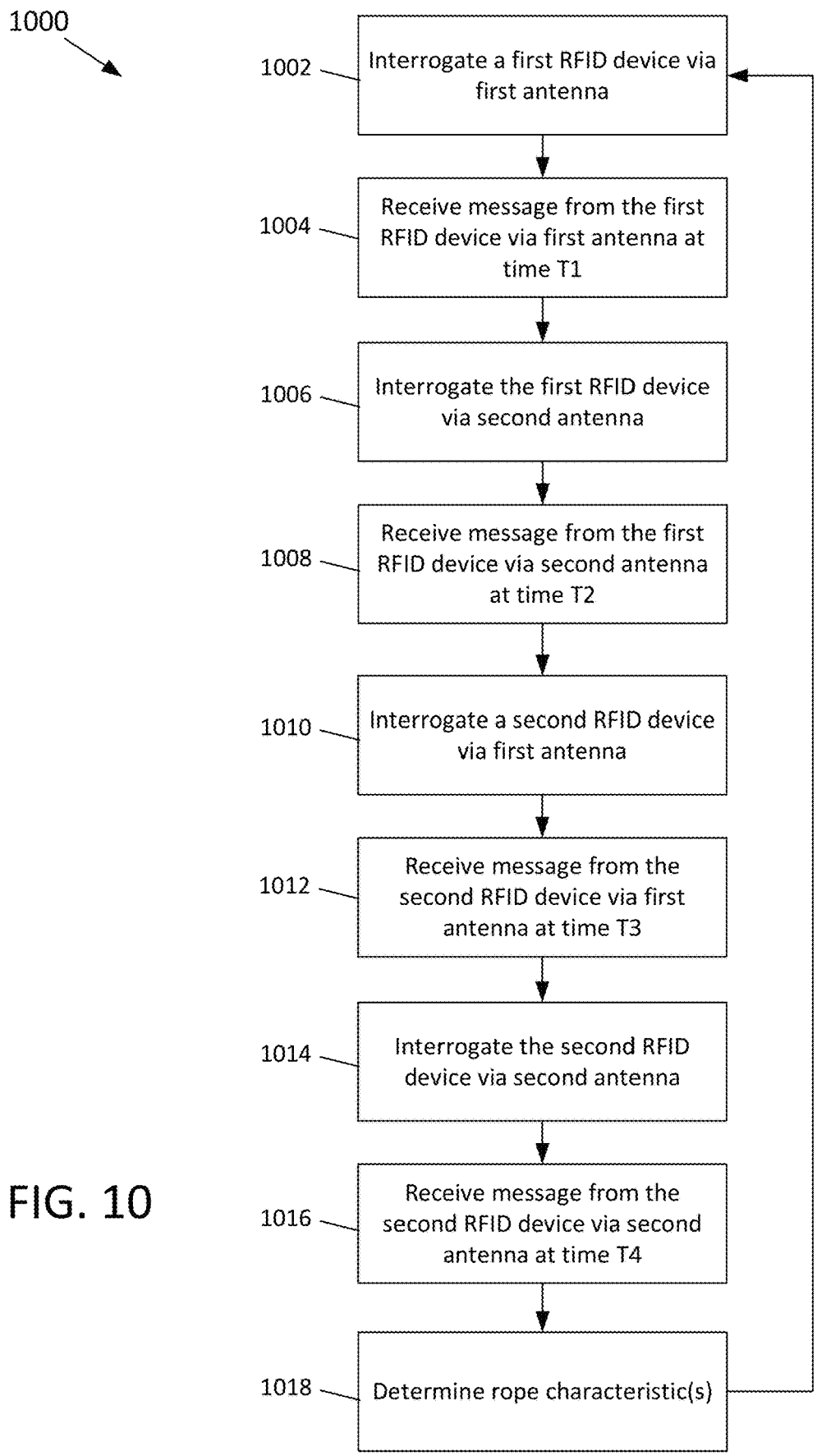
FIG. 10 is a flow diagram of a method for determining characteristics of a rope, in accordance with some embodiments.

FIG. 10 illustrates a method 1000 for determining at least one characteristic of a rope. In one example, the method 1000 is configured to be carried out by the rope monitoring system 900 of FIG. 9.

At block 1002, a first RFID device (e.g., RFID device 904b) is interrogated. In one example, the interrogation of the RFID device 904b is initiated by the transmitter of the reader 908 via the at least one first antenna 906a. As shown in FIG. 9, the RFID device 904b is interrogated while within the readout window of the first antenna 906a.

At block 1004, a message from the RFID device 904b is received by the receiver of the reader 908 (e.g., via the at least one first antenna 906a). In one example, the message is received at a first time T1. As discussed above, the message may include an identifier of the RFID device 904b (e.g., RFID1).

At block 1006, the RFID device 904b is interrogated a second time. In one example, the second interrogation of the RFID device 704b is initiated by the transmitter of the reader 908 via the at least one second antenna 906b. The RFID device 904b is interrogated while within the readout window of the second antenna 906b.

At block 1008, a message from the RFID device 704b is received by the receiver of the reader 908 (e.g., via the at least one second antenna 906b). In one example, the message is received at a second time T2 (e.g., time T2 occurs after time T1).

At block 1010, a second, subsequent RFID device (e.g., RFID device 904a) is interrogated. In one example, the interrogation of the RFID device 904a is initiated by the transmitter of the reader 908 via the at least one first antenna 906a. The RFID device 904b is interrogated while within the readout window of the first antenna 906a.

At block 1012, a message from the RFID device 904a is received by the receiver of the reader 908 (e.g., via the at least one first antenna 906a). In one example, the message is received at a third time T3 (e.g., time T3 occurs after at least time T1). As discussed above, the message may include an identifier of the RFID device 904a (e.g., RFID2).

At block 1014, the RFID device 904a is interrogated a second time. In one example, the second interrogation of the RFID device 904a is initiated by the transmitter of the reader 908 via the at least one second antenna 906b. The RFID device 904a is interrogated while within the readout window of the second antenna 906b.

At block 1016, a message from the RFID device 904a is received by the receiver of the reader 908 (e.g., via the at least one second antenna 906b). In one example, the message is received at a fourth time T4 (e.g., time T4 occurs after times T1, T2, and T3).

At block 1018, at least one characteristic of the rope 902 is determined. In some examples, such characteristics include the creep and elongation of the rope 902. In one example, the at least one characteristic is determined based on the spatial relationship of the plurality of RFID devices 904 and a timing of the received messages (e.g., times T1-T4). In some examples, the speed of the rope is used to determine the at least one characteristic. Given that the fixed baseline distance between the antennas 906a, 906b is known, the timing of the messages received from the same RFID device may be used to determine the speed of the rope. For example, the time delta between the messages received from RFID device 904b at times T1 and T2, or the time delta between the messages received from the RFID device 906a at times T3 and T4, may be used to determine the speed of the rope based on the fixed baseline distance between the antennas 906a, 906b. In some examples, the known (or expected) spacing between the RFID devices 904a, 904b can be derived from the spatial relationship of the plurality of RFID devices 904. The time delta between times T1 and T3 (or T2 and T4), in combination with the rope speed, can be used to measure the actual spacing between RFID devices 904a, 904b. The spacing delta between the known (or expected) spacing and the actual spacing is used to derive characteristics of the rope (e.g., creep, elongation, etc.). In some examples, the rope characteristics are presented to one or more users via the UI 910. The UI 910 may alert the user(s) when the rope characteristics reach (or exceed) the discard criteria for the rope.

As described above, the rope monitoring systems 700, 900, and 1100 may operate with an optimal readout window that is the maximum window that can be achieved without enabling interference from consecutive RFID devices. However, in other examples, the optimal readout window may be configured differently. For example, the antenna(s) of the corresponding systems may be adjusted such that the readout window encompasses two consecutive RFID devices. In such examples, the consecutive RFID devices are interrogated in parallel (or simultaneously) to determine at least one characteristic of the rope. For example, the inability to interrogate a pair of consecutive RFID devices in parallel may provide an indication that the spacing between the devices has increased (e.g., indicating creep or elongation). As such, the readout window may be configured based on the discard criteria for the rope, such that an alarm is issued when the rope reaches (or exceeds) the discard criteria.

Figure 11:
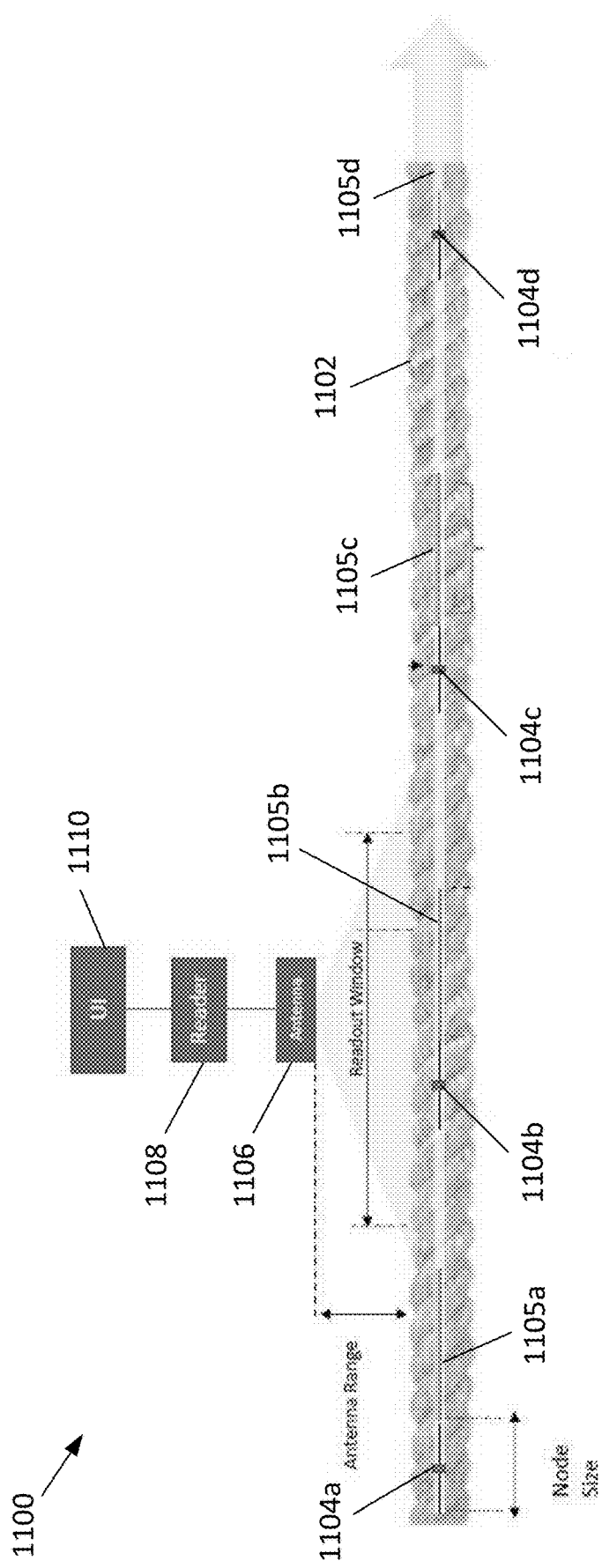
FIG. 11 is an illustration of a rope monitoring system, in accordance with some embodiments.

FIG. 11 illustrates a rope monitoring system 1100 in accordance with aspects described herein. In one example, the system 1100 is configured to monitor a rope 1102 that includes a plurality of RFID devices 1104 and a plurality of sensing elements 1105. In some examples, the system 1100 includes at least one antenna 1106, a reader 1108, and a UI 1110. In some examples, the UI 1110 is presented to a user via a display on the reader 1108. In some examples, the UI 1110 is presented to a user via another device in communication with the reader 1108 (e.g., a computer, cell phone, tablet, etc.).

In one example, the plurality of RFID devices 1104 are included in a drawn form factor of the rope 1102. In some examples, the form factor is integrated into a core portion of the rope 1102. In some examples, the plurality of RFID devices 1104 are linearly dispersed in the form factor of the rope 1102. In one example, the plurality of RFID devices 704 may be dispersed such that consecutive RFID devices have a substantially uniform spacing. In other examples, consecutive RFID devices may have a non-uniform spacing.

Each sensing element of the plurality of sensing elements 1105 corresponds to an RFID device of the plurality of RFID devices 1104. In some examples, two or more sensing elements of the plurality of sensing elements 1105 correspond to the same RFID device. In some examples, the plurality of sensing elements 1105 are included in the drawn form factor of the rope 1102. In other examples, the plurality of sensing elements 1105 are included in the RFID devices 1104. The plurality of sensing elements 1105 may include temperature sensors, strain gauges, pressure sensors, accelerometers, or any other suitable type of sensing element or measurement device. In some examples, each sensing element of the plurality of sensing elements 1105 is the same type of sensing element. In some examples, the plurality of sensing elements 1105 includes two or more different types of sensing elements. For example, the sensing element 1105a associated with RFID device 1104a may be a first type (e.g., a temperature sensor) and the sensing element 1105b associated with RFID device 1104b may be a second type (e.g., a strain gauge), the sensing element 1105c associated with RFID device 1104c may be the first type (e.g., a temperature sensor), and so on. In another example, a first sensing element of a first type (e.g., a temperature sensor) may be associated with RFID device 1104a, a second sensing element of the first type (e.g., a temperature sensor) and a third sensing element of a second type (e.g., a strain gauge) may be associated with RFID device 1104b, a fourth sensing element of the first type (e.g., a temperature sensor) may be associated with RFID device 1104c, and so on. In some examples, by including different types of sensing elements in the rope 1102, different parameters or characteristics of the rope can be measured with desired, or different, resolutions across the length of the rope 1102.

While not shown, the reader 1108 includes a transmitter and a receiver. In some examples, the reader 1108 includes a transceiver that includes the transmitter and receiver. The transmitter is configured to transmit energy to initiate an interrogation of each RFID device. Likewise, the receiver is configured to receive energy transmitted back from each RFID device. In one example, the transmitter and the receiver are coupled to the at least one antenna 1106 to transmit/receive energy. In some examples, the transmitter and receiver are coupled to a common antenna. In other examples, the transmitter and receiver are coupled to different antennas.

In some examples, the antenna 1106 has a readout window corresponding to the beamwidth of the antenna 1106 and the antenna range (e.g., the distance between the antenna 1106 and the rope 1102). The readout window may be decreased by moving the antenna 1106 closer to the rope 1102. Likewise, the readout window may be increased by moving the antenna 1106 away from the rope 1102. In some examples, the amount of energy transmitted by the antenna 1106 is adjusted based on the position of the antenna. For example, if the antenna 1106 is positioned farther away from the rope 1102, the energy level may be increased. Likewise, if the antenna is positioned closer to the rope 1102, the energy level may be decreased. In some examples, the amount of energy transmitted by the antenna 1106 is adjusted based, at least in part, on the configuration of each RFID device antenna and/or the RFID device density across the rope 1102.

In one example, the antenna 1106 is positioned relative to the rope 1102 to provide an optimal readout window. In some examples, the optimal readout window is the maximum (or widest) window that can be achieved without enabling interference from consecutive RFID devices. For example, the optimal readout window may be less than the spacing between consecutive RFID devices of the plurality of RFID devices 1104. In some examples, the directivity pattern of the antenna 1106 enables the optimal readout window to be larger than the spacing between consecutive RFID devices. In some examples, the rope 1102 is configured to move with respect to the antenna 1106 to interrogate each RFID device. In other examples, the antenna 1106 is configured to move with respect to the rope 1102 to interrogate each RFID device.

When interrogated by the transmitter, each RFID device of the plurality of RFID devices 1104 transmits a message back to the receiver (e.g., via the antenna 1106). In one example, the message includes measurement data collected by the sensing element(s) associated with the RFID device. In some examples, the measurement data corresponds to a measurement taken (or sampled) by the sensing element(s) at the time of interrogation. For example, the sensing element(s) may be passive devices that rely on a portion of the energy delivered to the RFID device from the transmitter to perform a measurement. As such, the received energy may be used by the sensing element(s) to sample a value (e.g., resistance) that provides an indication of a parameter (e.g., temperature, strain, etc.). The sampled value is provided to the corresponding RFID device and included in the message as the measurement data. In some examples, the reader 1108 or another device is configured to convert the sampled value into the measured parameter or characteristic. For example, the reader 1108 may reference a look-up table or use one or more algorithms to convert the sampled value into the measured parameter. In some examples, the sampled value is converted into the measured parameter by the sensing element(s) or the corresponding RFID device before being included in the message as the measurement data. In other examples, the measurement data may represent a plurality of samples collected by the sensing element(s) over a period of time (e.g., between interrogations). In some examples, an identifier of the corresponding RFID device (e.g., RFID1, RFID2, etc.) is included in the message.

In some examples, the measurement data provides an indication of at least one characteristic of the rope 1102 (e.g., creep, elongation, etc.). For example, measurement data representing rope strain across the length of the rope 1102 may provide an indication of creep, elongation, or other rope characteristics. In some examples, the measurement data enables the determination of at least one rope characteristic. For example, measurement data representing temperature across the length of the rope 1102 may be used to determine (or calculate) creep, elongation, or other rope characteristics. In some examples, the reader 708 includes at least one processor or controller configured to determine the at least one rope characteristic. In other examples, a different processor or controller in communication with the reader 708 is configured to perform the determination of the rope characteristic(s). In some examples, the rope characteristics are presented to one or more users via the UI 1110. The UI 1110 may alert the user(s) when the rope characteristics reach (or exceed) the discard criteria for the rope.

Figure 12:
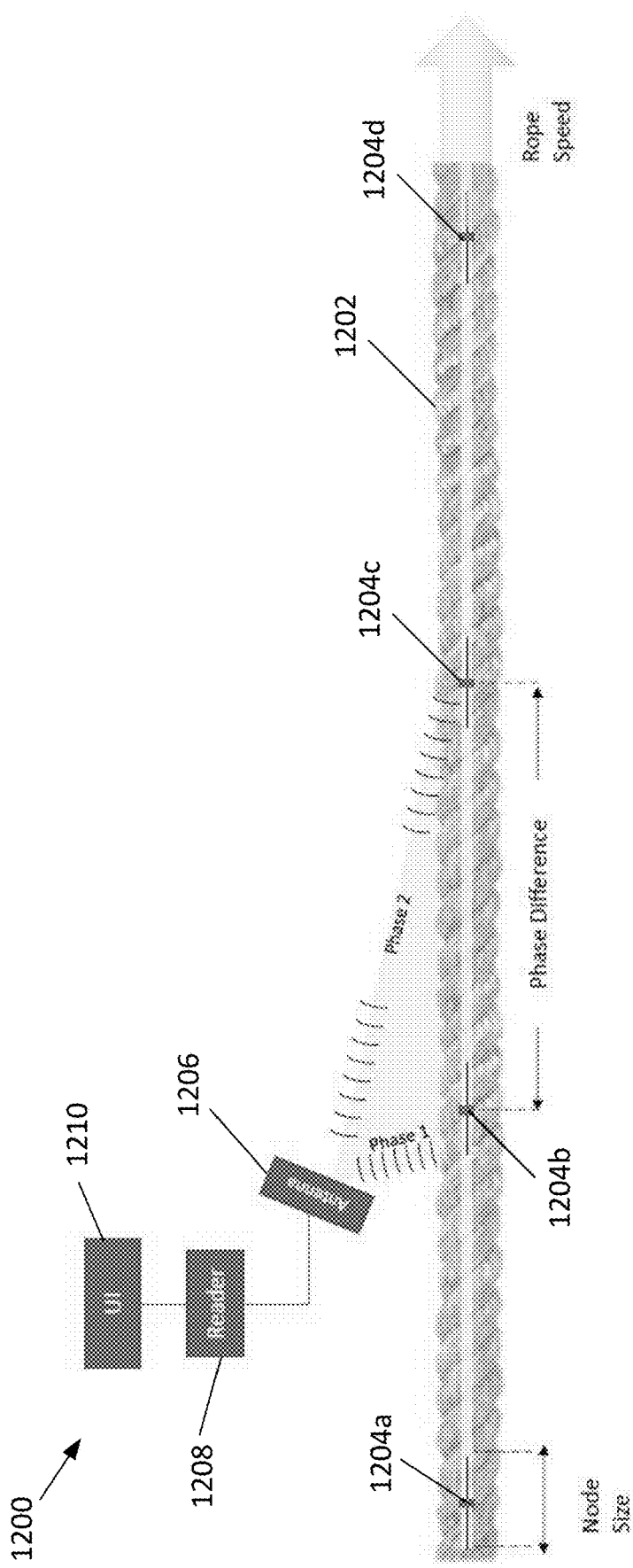
FIG. 12 is an illustration of a rope monitoring system, in accordance with some embodiments.

FIG. 12 illustrates a rope monitoring system 1200 in accordance with aspects described herein. In one example, the system 1200 is configured to monitor a rope 1202 that includes a plurality of RFID devices 1204. In some examples, the system 1200 includes at least one antenna 1206, a reader 1208, and a UI 1210. In some examples, the UI 1210 is presented to a user via a display on the reader

1208. In some examples, the UI 1210 is presented to a user via another device in communication with the reader 1208 (e.g., a computer, cell phone, tablet, etc.).

In one example, the plurality of RFID devices 1204 are included in a drawn form factor of the rope 1202. In some examples, the form factor is integrated into a core portion of the rope 1202. In some examples, the plurality of RFID devices 1204 are linearly dispersed in the form factor of the rope 1202. In one example, the plurality of RFID devices 1204 may be dispersed such that consecutive RFID devices have a substantially uniform spacing. In other examples, consecutive RFID devices may have a non-uniform spacing.

While not shown, the reader 1208 includes a transmitter and a receiver. In some examples, the reader 1208 includes a transceiver that includes the transmitter and receiver. The transmitter is configured to transmit energy to initiate an interrogation each RFID device. Likewise, the receiver is configured to receive energy transmitted back from each RFID device. In one example, the transmitter and the receiver are coupled to the at least one antenna 1206 to transmit/receive energy. In some examples, the transmitter and receiver are coupled to a common antenna. In other examples, the transmitter and receiver are coupled to different antennas.

In some examples, the antenna 1206 has a readout window corresponding to the beamwidth of the antenna 1206 and the antenna range (e.g., the distance between the antenna 1206 and the rope 1202). The readout window may be decreased by moving the antenna 1206 closer to the rope 1202 and increased by moving the antenna 1206 away from the rope 1202. Likewise, the readout window may increase as the antenna 1206 is turned away from the rope 1202. In some examples, the amount of energy transmitted by the antenna 1206 is adjusted based on the position of the antenna. For example, if the antenna 1206 is positioned farther away from the rope 1202 (e.g., to achieve the optimal readout window), the energy level may be increased. Likewise, if the antenna 1206 is positioned closer to the rope 1202, the energy level may be decreased. In some examples, the amount of energy transmitted by the antenna 1206 is adjusted based, at least in part, on the configuration of each RFID device antenna and/or the RFID device density across the rope 1202.

In one example, the antenna 1206 is positioned relative to the rope 1202 to provide an optimal readout window. In some examples, the optimal readout window is the maximum (or widest) window that can be achieved without enabling undesired interference from RFID devices. For example, the optimal readout window may be larger than the spacing between consecutive RFID devices of the plurality of RFID devices 1204. As such, the optimal readout window may enable two consecutive RFID devices to be positioned within the readout window simultaneously.

When interrogated by the transmitter, each RFID device of the plurality of RFID devices 1204 transmits a message back to the receiver (e.g., via the antenna 1206). In one example, the message includes an identifier of the corresponding RFID device (e.g., RFID1, RFID2, etc.). In some examples, each RFID device includes or is coupled to at least one sensing element (e.g., a temperature sensor, strain gauge, etc.). In such examples, the message may include measurements (or other data) collected by the at least one sensing element. Each message is carried by a message signal that is transmitted by the RFID device. The message signal is an RF signal having an amplitude and frequency. In some examples, the frequency of the message signal corresponds to the frequency of the energy transmitted by the transmitter. In some examples, the messages received at the receiver enable the determination of at least one characteristic of the rope 1202 (e.g., creep, elongation, etc.). In one example, the determination is based on the spatial relationship of the plurality of RFID devices 1204 and a timing of the received messages. In some examples, the phase of each message signal is used to determine the at least one characteristic of the rope 1202. In some examples, the reader 1208 includes at least one processor or controller configured to determine the at least one rope characteristic. In other examples, a different processor or controller in communication with the reader 1208 is configured to perform the determination of the rope characteristic(s).

Figure 13:
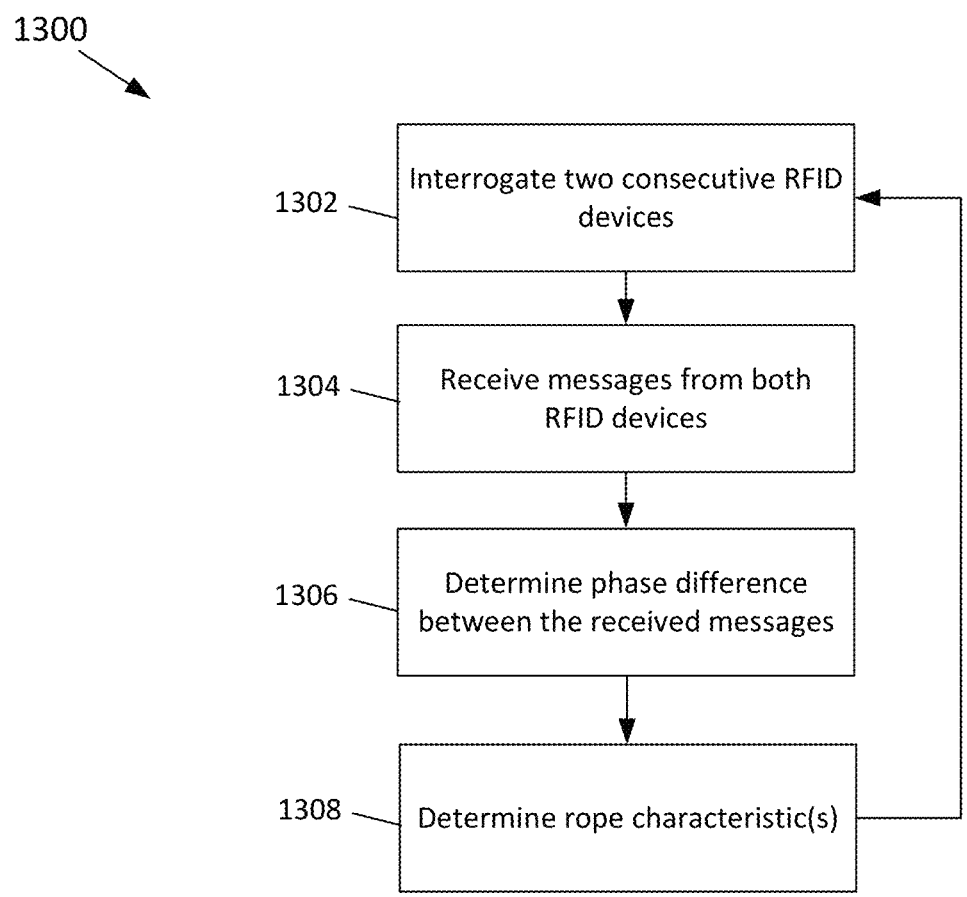
FIG. 13 is a flow diagram of a method for determining characteristics of a rope, in accordance with some embodiments.

FIG. 13 illustrates a method 1300 for determining at least one characteristic of a rope. In one example, the method 1300 is configured to be carried out by the rope monitoring system 1200 of FIG. 12.

At block 1302, a first RFID device (e.g., RFID device 1204*c*) and a second, consecutive RFID device (e.g., RFID device 1204*b*) are interrogated in parallel (or simultaneously). In one example, the interrogation of the RFID devices 1204*b*, 1204*c* is initiated by the transmitter of the reader 1208 via the at least one antenna 1206. As shown in FIG. 12, the RFID devices 1204*b*, 1204*c* are interrogated while within the readout window of the antenna 1206.

At block 1304, a message from each RFID device 1204*b*, 1204*c* is received by the receiver of the reader 1208 (e.g., via the at least one antenna 1206). In one example, the message from the RFID device 1204*b* is received at a first time T1 and the message from the RFID device 1204*c* is received at a second time T2. In some examples, the second time T2 is later than the first time T1 due to the differences in distance between each of the RFID devices 1204*b*, 1204*c* and the antenna 1206. As discussed above, each message may include an identifier of the RFID devices 1204*b*, 1204*c* (e.g., RFID1, RFID2, etc.).

At block 1306, a phase difference between the received messages is determined. In some examples, the message from the RFID device 1204*b* is carried by a first message signal having a phase of $\phi 1$ and the message from the RFID device 1204*c* is carried by a second message signal having a phase of $\phi 2$. As such, the phase difference between the messages is the phase delta between phases $\phi 1$ and $\phi 2$ (i.e., $\phi 2 - \phi 1$). In some examples, the phase delta corresponds to the time delta between times T1 and T2.

At block 1308, at least one characteristic of the rope 702 is determined. In some examples, such characteristics include the creep and elongation of the rope 702. In one example, the at least one characteristic is determined based on the spatial relationship of the plurality of RFID devices 704 and a timing of the received messages (e.g., the phase difference determined in block 1306). For example, the known (or expected) spacing between the RFID devices 1204*b*, 1204*c* can be derived from the spatial relationship of the plurality of RFID devices 1204. The expected spacing may correspond to an expected phase difference between the RFID devices 1204*b*, 1206*b*. As such, any deviation from the expected phase difference between consecutive RFID devices indicates a change in the spacing (or distance) between the RFID devices. This change in spacing may be compared to the known (or expected) spacing to derive characteristics of the rope (e.g., creep, elongation, etc.). In some examples, the rope characteristics are presented to one or more users via the UI 1210. The UI 1210 may alert the user(s) when the rope characteristics reach (or exceed) the discard criteria for the rope.

Figure 14:
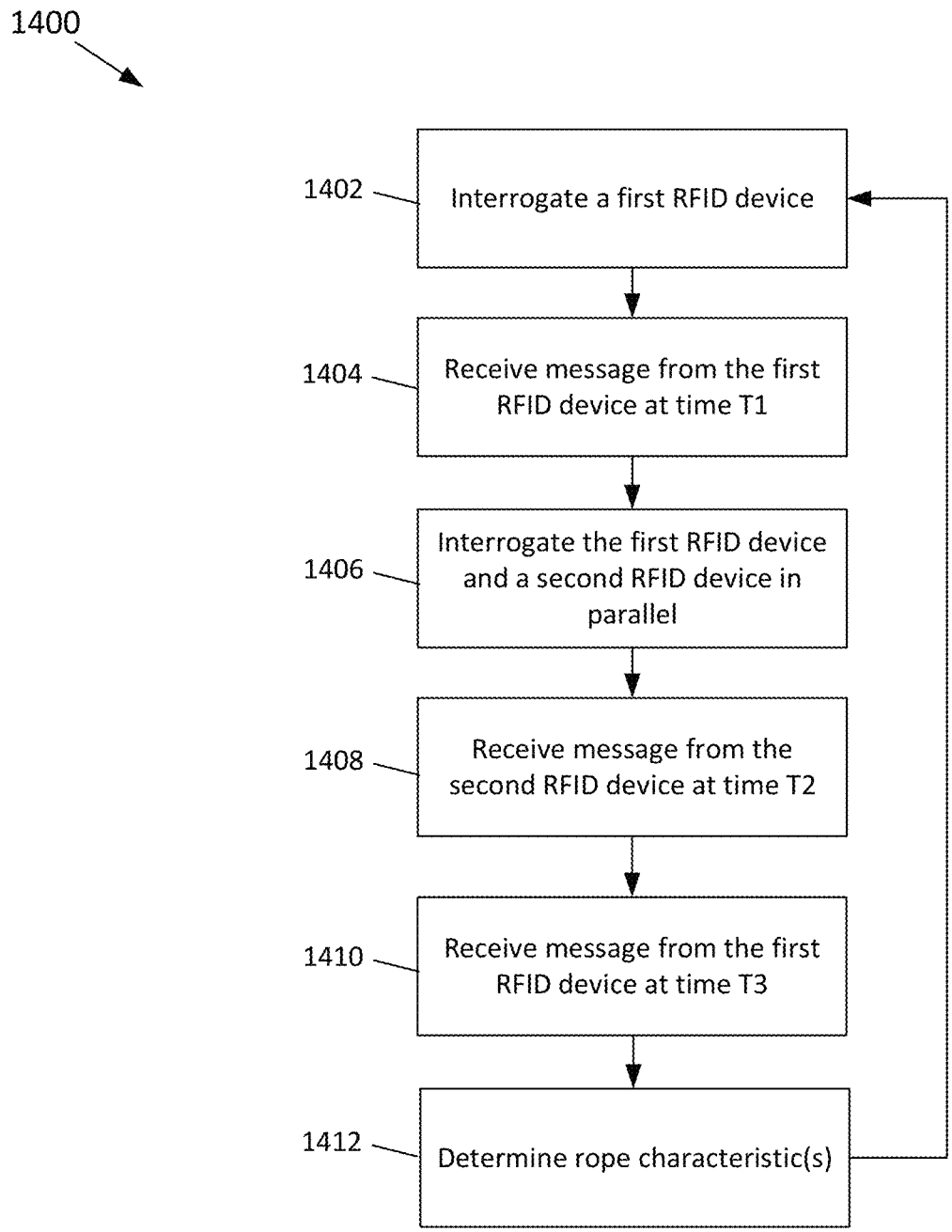
FIG. 14 is a flow diagram of a method for determining characteristics of a rope, in accordance with some embodiments.

FIG. 14 illustrates another method 1400 for determining at least one characteristic of a rope. In one example, the method 1400 is configured to be carried out by the rope monitoring system 1200 of FIG. 12.

At block 1402, a first RFID device (e.g., RFID device 1204c) is interrogated. In one example, the interrogation of the RFID device 1204c is initiated by the transmitter of the reader 1208 via the at least one antenna 1206.

At block 1404, a message from the RFID device 1204c is received by the receiver of the reader 908 (e.g., via the at least one antenna 1206). In one example, the message is received at a first time T1. As discussed above, the message may include an identifier of the RFID device 1204c (e.g., RFID1).

At block 1406, the first RFID device 1204c and a second, consecutive RFID device (e.g., RFID device 1204b) are interrogated in parallel (or simultaneously). In one example, the interrogation of the RFID devices 1204b, 1204c is initiated by the transmitter of the reader 1208 via the at least one antenna 1206.

At block 1408, a message from the second RFID device 1204b is received by the receiver of the reader 1208 (e.g., via the at least one antenna 1206). In one example, the message is received at a second time T2 (e.g., time T2 occurs after time T1).

At block 1410, a message from the first RFID device 1204c is received by the receiver of the reader 1208 (e.g., via the at least one antenna 1206). In one example, the message is received at a third time T3 (e.g., time T3 occurs after times T1 and T2).

At block 1412, at least one characteristic of the rope 1202 is determined. In some examples, such characteristics include the creep and elongation of the rope 1202. In one example, the at least one characteristic is determined based on the spatial relationship of the plurality of RFID devices 904 and a timing of the received messages (e.g., times T1-T3). In some examples, the speed of the rope is used to determine the at least one characteristic. In one example, the speed of the rope is determined based on the messages received from the first RFID device 1204c (e.g., at times T1 and T3). For example, the rope speed may be calculated using the phase delta between the message received from first RFID device 1204c at time T1 and the message received from first RFID device 1204c at time T3. The phase delta may be divided by the time delta between times T1 and T3 to produce a rope speed. The resulting rope speed in degrees-per-second (or radians-per-second) may be converted into meters-per-second based on the frequency (or wavelength) of the energy transmitted by the transmitter. In some examples, the known (or expected) spacing between the RFID devices 1204b, 1204c can be derived from the spatial relationship of the plurality of RFID devices 1204. The time delta between times T1 and T2, in combination with the rope speed, can be used to measure the actual spacing between RFID devices 1204b, 1204c. The spacing delta between the known (or expected) spacing and the actual spacing is used to derive characteristics of the rope (e.g., creep, elongation, etc.).

Figure 15:
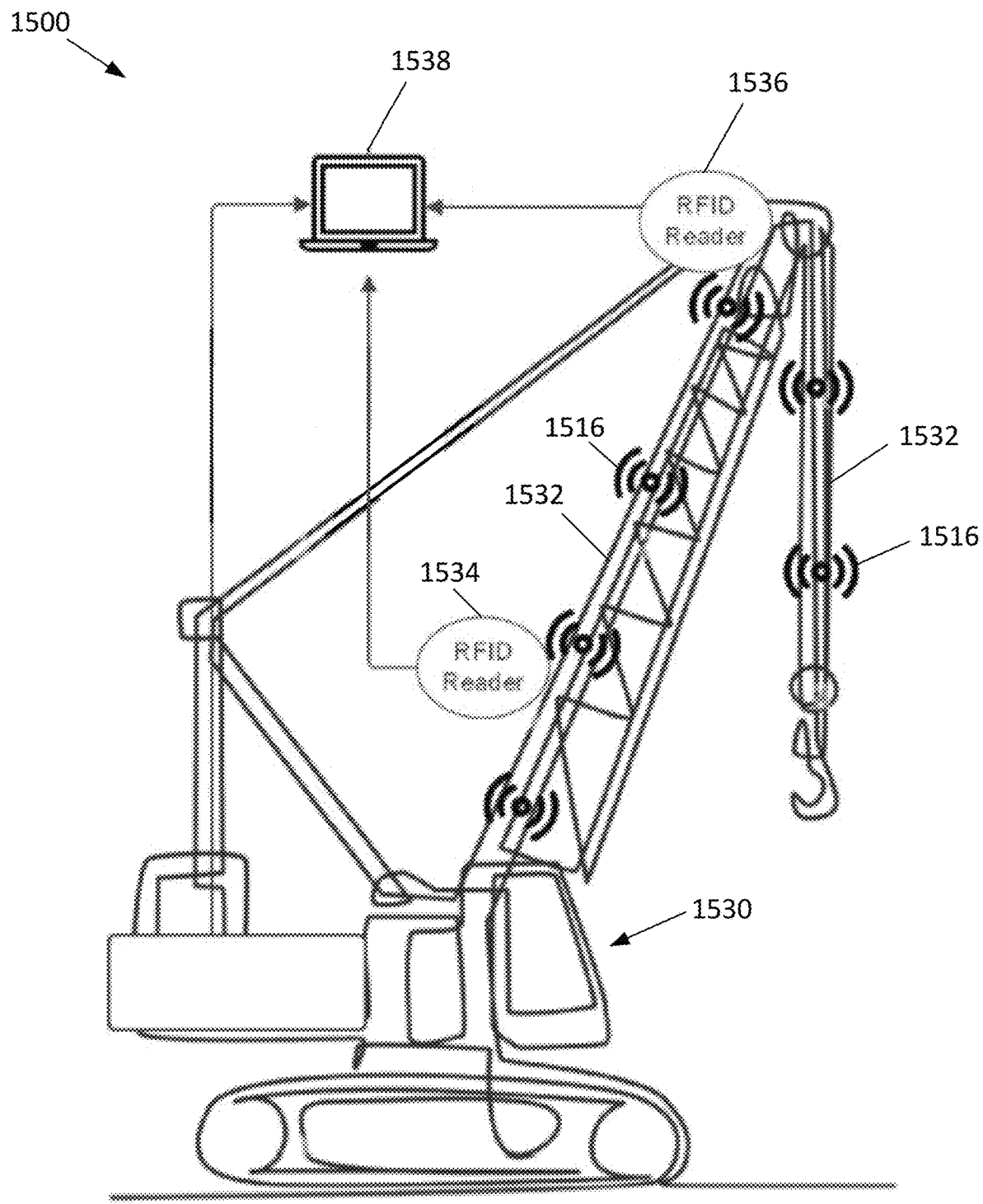
FIG. 15 is an illustration of a crane employing a rope monitoring system, in accordance with some embodiments.

As described above, the embodiments described herein may be employed in various applications, such as a lifting crane. For example, referring to FIG. 15, a system 1500 for monitoring the condition of a rope 1532 into which a plurality of RFID devices 1516 has been integrated or incorporated is shown. In one example, the rope 1532 corresponds to rope 702 of FIG. 7, rope 902 of FIG. 9, rope 1102 of FIG. 11, or rope 1202 of FIG. 12. In some examples, each RFID device includes at least one sensing element (e.g., a temperature sensor). In some examples, each RFID device is coupled to at least one sensing element (e.g., also integrated or incorporated in the rope 1532). For the purpose of illustration, rather than limitation, the system 1500 is incorporated into a construction crane 1530, such that the rope 1532 may be used for raising and lowering weights that, during operation, place the rope in tension, causing the rope to undergo elastic and plastic elongation. In operation, the crane 1530 and the rope 1532 may be used under various environmental conditions of varying temperatures, humidity, and the like.

Advantageously, the RFID devices 1516 incorporated into a form factor (e.g., a fiber) and further integrated or incorporated into the rope 1532 are structured and arranged to provide passive signals to one or more RFID readers 1534, 1536 positioned at desired locations on the crane 1530. In some examples, the RFID readers 1534, 1536 each correspond to the antenna 706 and reader 708 of FIG. 7, the antennas 906a, 906b and reader 908 of FIG. 9, the antenna 1106 and reader 1108 of FIG. 11, or the antenna 1206 and reader 1208 of FIG. 12. Such passive signals provide data that may include, for example, spatial measurements between RFID devices 1516, environmental temperature, strain, and so forth. This data may, in turn, be provided to a local or remote processing device 1538 for the purpose of monitoring the condition of the rope 1532 and, moreover, determining characteristics of the rope and identifying relationships between the strain, creep, temperature, and so forth. Such data may be used, for example, to determine algorithms having to do with the non-linear relationship between temperature and/or other environmental variables and fatigue or creep of the rope 1532. In turn, the algorithms and relationships may be used to arrive at refined discard criteria for the rope 1532. In some examples, the remote processing device 1538 includes a UI similar to the UI 710 of FIG. 7, the UI 910 of FIG. 9, the UI 1110 of FIG. 11, or the UI 1210 of FIG. 12.

While the example above describes the application of a crane, it should be appreciated that rope monitoring systems described herein can be implemented in a variety applications. Such applications may include, but are not limited to, gondolas, ski lifts, bridge supports, maritime applications, moorings, oil rigs, elevators, window cleaning lifts, amusement park attractions, ziplines, deployable ladders, parachutes, winches, and vehicle lifts.

Figure 16:
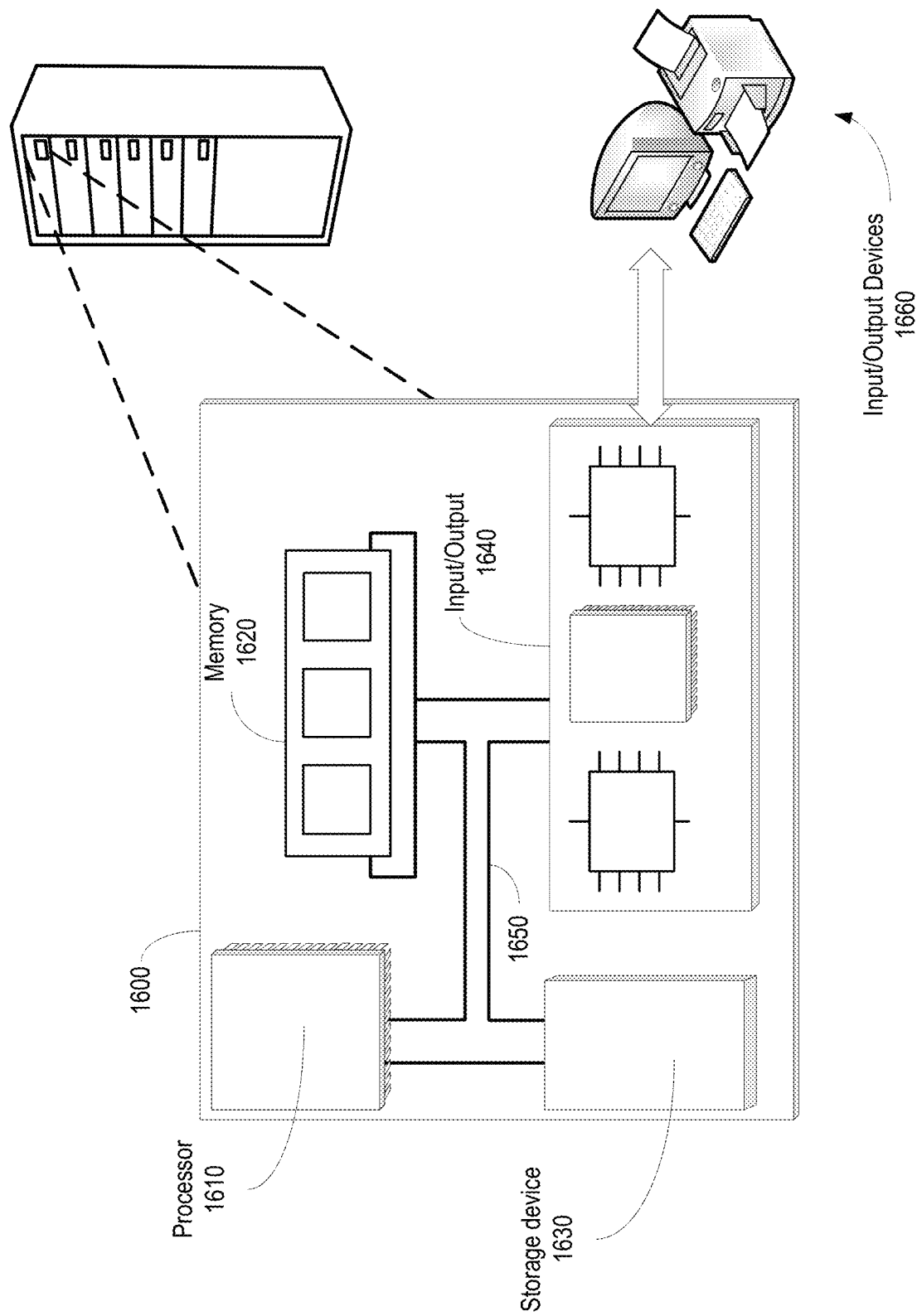
FIG. 16 is an illustration of an example computing system.

FIG. 16 is a block diagram of an example computer system 1600 that may be used in implementing the technology described in this document. General-purpose computers, network appliances, mobile devices, or other electronic systems may also include at least portions of the system 1600. The system 1600 includes a processor 1610, a memory 1620, a storage device 1630, and an input/output device 1640. Each of the components 1610, 1620, 1630, and 1640 may be interconnected, for example, using a system bus 1650. The processor 1610 is capable of processing instructions for execution within the system 1600. In some implementations, the processor 1610 is a single-threaded processor. In some implementations, the processor 1610 is a multi-threaded processor. In some implementations, the processor 1610 is a programmable (or reprogrammable) general purpose microprocessor or microcontroller. The processor 1610 is capable of processing instructions stored in the memory 1620 or on the storage device 1630.

The memory 1620 stores information within the system 1600. In some implementations, the memory 1620 is a non-transitory computer-readable medium. In some implementations, the memory 1620 is a volatile memory unit. In some implementations, the memory 1620 is a non-volatile memory unit.

The storage device 1630 is capable of providing mass storage for the system 1600. In some implementations, the storage device 1630 is a non-transitory computer-readable medium. In various different implementations, the storage device 1630 may include, for example, a hard disk device, an optical disk device, a solid-date drive, a flash drive, or some other large capacity storage device. For example, the storage device may store long-term data (e.g., database data, file system data, etc.). The input/output device 1640 provides input/output operations for the system 1600. In some implementations, the input/output device 1640 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1630 may be implemented in a distributed way over a network, for example as a server farm or a set of widely distributed servers, or may be implemented in a single computing device.

Although an example processing system has been described in FIG. 16, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, a data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array), an ASIC (application specific integrated circuit), or a programmable general purpose microprocessor or microcontroller. A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA, an ASIC, or a programmable general purpose microprocessor or microcontroller.

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship between client and server arises by virtue of computer programs running on the respective computers and having a client-server relationship with each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for monitoring performance of a rope, the system comprising:
   a drawn form factor comprising a plurality of radio-frequency identification (RFID) devices linearly dispersed in the form factor, the form factor being integrated into a core portion of the rope,
   wherein each RFID device of the plurality of RFID devices is configured to transmit a corresponding message to at least one receiver in response to an interrogation initiated by at least one transmitter, the messages enabling the determination of at least one characteristic of the rope based on at least one spatial relationship of a pair of RFID devices and a timing of the received messages.

2. The system of claim 1, wherein the at least one characteristic of the rope comprises at least one of a creep or an elongation of the rope.

3. The system of claim 1, wherein consecutive RFID devices have a substantially uniform spacing.

4. The system of claim 1, wherein consecutive RFID devices have a non-uniform spacing.

5. The system of claim 1, wherein the message transmitted by each RFID device of the plurality of RFID devices comprises an identifier of the corresponding RFID device.

6. The system of claim 1, wherein at least one RFID device of the plurality of RFID devices comprises at least one sensor.

7. The system of claim 6, wherein the at least one sensor comprises a temperature sensor.

8. The system of claim 1, further comprising:
   a first transmitter configured to initiate interrogation of the plurality of RFID devices by transmitting energy to the plurality of RFID devices; and
   a first receiver configured to receive the corresponding messages transmitted by the plurality of RFID devices.

9. The system of claim 8, wherein the first transmitter and the first receiver are included in a first transceiver.

10. The system of claim 8, further comprising:
    at least one first antenna coupled to the first transmitter and the first receiver.

11. The system of claim 10, wherein the at least one first antenna is positioned relative to the rope to provide an optimal readout window.

12. The system of claim 11, wherein the optimal readout window is less than a spacing between consecutive RFID devices of the plurality of RFID devices.

13. The system of claim 11, wherein an amount of energy transmitted by the first transmitter is adjustable based on the position of the at least one first antenna.

14. The system of claim 10, further comprising:
a sensor configured to measure a speed of the rope.

15. The system of claim 14, wherein the measured speed of the rope is for use in determining the at least one characteristic of the rope.

16. The system of claim 10, wherein the message transmitted by each RFID device is carried via a return signal received by the first receiver.

17. The system of claim 16, wherein the first transmitter is configured to initiate an interrogation of a first RFID device of the plurality of RFID devices and a second RFID device of the plurality of RFID devices in parallel and further wherein a phase difference between the two return signals received at the first receiver is for use in determining the at least one characteristic of the rope.

18. The system of claim 17, wherein the first and second RFID devices are consecutive devices.

19. The system of claim 16, wherein the first transmitter is configured to initiate an interrogation of a first RFID device of the plurality of RFID devices (i) at a first time to produce a first return signal and (ii) at a second time to produce a second return signal, wherein a phase difference between the first and second return signals is for use in determining a speed of the rope.

20. The system of claim 19, wherein the speed of the rope is for use in determining the at least one characteristic of the rope.

21. The system of claim 10, further comprising:
a second transmitter configured to initiate an interrogation of the plurality of RFID devices by transmitting energy to the plurality of RFID devices;
a second receiver configured to receive the corresponding messages transmitted by the plurality of RFID devices; and
at least one second antenna coupled to the second transmitter and the second receiver.

22. The system of claim 21, wherein the second transmitter and the second receiver are included in a second transceiver.

23. The system of claim 21, wherein the at least one first antenna and the at least one second antenna are separated by a fixed distance.

24. The system of claim 23, wherein the fixed distance and the timing of the received messages from the plurality of RFID devices are for use in determining a speed of the rope.

25. A system for monitoring a condition of a rope, the system comprising:
a drawn form factor comprising a plurality of radio-frequency identification (RFID) devices each coupled to at least one corresponding sensing element, the form factor being integrated into a core portion of the rope, wherein each RFID device of the plurality of RFID devices is configured to transmit measurement data, collected by the at least one corresponding sensing element, to at least one receiver in response to an interrogation initiated by at least one transmitter.

26. The system of claim 25, wherein the at least one sensing element comprises at least one of a strain gauge, a temperature sensor, a pressure sensor, or an accelerometer.

27. The system of claim 25, wherein the at least one sensing element is a passive device.

28. The system of claim 25, wherein the measurement data provides an indication of at least one characteristic of the rope.

29. The system of claim 28, wherein the at least one characteristic of the rope comprises at least one of a creep or an elongation of the rope.

30. The system of claim 25, wherein the measurement data enables the determination of at least one characteristic of the rope.

31. The system of claim 25, wherein the plurality of RFID devices are linearly dispersed in the form factor.

32. The system of claim 31, wherein consecutive RFID devices have a substantially uniform spacing.

33. The system of claim 31, wherein consecutive RFID devices have a non-uniform spacing.

34. The system of claim 25, wherein each RFID device of the plurality of RFID devices is configured to transmit the measurement data in a message.

35. The system of claim 34, wherein the message comprises an identifier of the corresponding RFID device.

36. The system of claim 25, further comprising:
a transmitter configured to initiate interrogation of the plurality of RFID devices by transmitting energy to the plurality of RFID devices; and
a receiver configured to receive the corresponding messages transmitted by the plurality of RFID devices.

37. The system of claim 36, wherein the transmitter and the receiver are included in a transceiver.

38. The system of claim 36, further comprising:
at least one antenna coupled to the transmitter and the receiver.

39. The system of claim 38, wherein the at least one antenna is positioned relative to the rope to provide an optimal readout window.

40. The system of claim 39, wherein the optimal readout window is less than a spacing between consecutive RFID devices of the plurality of RFID devices.

41. The system of claim 39, wherein an amount of energy transmitted by the transmitter is adjustable based on the position of the at least one antenna.

42. The system of claim 39, wherein the at least one antenna is configured to move with respect to the rope.

43. A method of manufacturing a form factor capable of being integrated into a rope for the purpose of monitoring a condition of the rope, the method comprising the steps of:
positioning a radio-frequency identification (RFID) device and at least one sensing element within a pocket of a preform material; and
drawing the form factor by causing the preform material to flow, wherein the drawing step embeds the RFID device and the at least one sensing element within the drawn form factor.

44. The method of claim 43, wherein the RFID device is coupled to the at least one sensing element.

45. The method of claim 43, wherein the at least one sensing element is included within the RFID device.

46. The method of claim 43, wherein the RFID device comprises an RFID device die.

47. The method of claim 46, wherein positioning the RFID device within the pocket of the preform material comprises coupling the RFID device die to a wire in the preform material.

48. The method of claim 47, further comprising:
attaching an antenna to the RFID device die embedded within the drawn form factor such that the antenna is electrically coupled to the RFID device die.

49. The method of claim 48, further comprising:
creating at least one discontinuity in the wire such that the RFID device die is electrically isolated from a remaining portion of the wire.

50. The method of claim 47, further comprising:
creating at least one discontinuity in the wire such that a portion of the wire coupled to the RFID device die forms an antenna.

\* \* \* \* \*